(12) United States Patent
McCool et al.

(10) Patent No.: US 10,369,894 B2
(45) Date of Patent: Aug. 6, 2019

(54) PARKING ALIGNMENT SEQUENCE FOR WIRELESSLY CHARGING AN ELECTRIC VEHICLE

(71) Applicant: HEVO Inc., Brooklyn, NY (US)

(72) Inventors: Jeremy Ryan McCool, New York, NY (US); Umer Anwer, Niagara Falls (CA); Alap Shah, Jersey City, NJ (US); Kunal Kamle, New York, NY (US)

(73) Assignee: HEVO, Inc., Brooklyn, NY (US)

( * ) Notice: Subject to any disclaimer, the term of this patent is extended or adjusted under 35 U.S.C. 154(b) by 0 days.

(21) Appl. No.: 15/331,274

(22) Filed: Oct. 21, 2016

(65) Prior Publication Data

US 2018/0111492 A1    Apr. 26, 2018

(51) Int. Cl.
*B60L 11/18* (2006.01)
*G01C 21/34* (2006.01)
(Continued)

(52) U.S. Cl.
CPC ........... *B60L 11/1838* (2013.01); *B60L 53/12* (2019.02); *B60L 53/38* (2019.02); *B60L 53/60* (2019.02); *G01C 21/3469* (2013.01); *G01C 21/3664* (2013.01); *G01C 21/3676* (2013.01); *H02J 7/025* (2013.01); *H04W 4/023* (2013.01);
(Continued)

(58) Field of Classification Search
CPC .......................... B60L 11/1838; B60L 11/182; B60L 2250/16; G01C 21/3469; G01C 21/3664; G01C 21/3676; H02J 7/025; H02J 7/027; H02J 50/00; H02J 50/10; H02J 50/80;
(Continued)

(56) References Cited

U.S. PATENT DOCUMENTS 3,801,022 A    4/1974   Cassey et al.
5,264,776 A   11/1993   Hulsey et al.
(Continued)

FOREIGN PATENT DOCUMENTS

EP          2985876       2/2018
WO     WO 2011/049352    4/2011

OTHER PUBLICATIONS

PCT/US2017/057910 , "International Search Report and Written Opinion", dated Jan. 25, 2018, 13 pages.

*Primary Examiner* — Jerrah Edwards
(74) *Attorney, Agent, or Firm* — Kilpatrick Townsend & Stockton LLP

(57) ABSTRACT

A parking alignment sequence for wirelessly charging an electric vehicle can include determining a location of a charging station by a processing device of a user device based on communication over a cellular network. The charging station can have a transmitter for wirelessly transmitting power to a receiver of the electric vehicle. A first user interface having directions to the charging station from a current location of the user device can be displayed. Alignment data can be wirelessly received via a communication path that is independent of the cellular network in response to the electric vehicle being located within a predetermined distance from the charging station. A second user interface having alignment instructions can be displayed for moving the electric vehicle into alignment based on the alignment data in response to the electric vehicle being located within the predetermined distance from the charging station.

20 Claims, 20 Drawing Sheets

(51) Int. Cl.
*G01C 21/36* (2006.01)
*H02J 7/02* (2016.01)
*H04W 4/00* (2018.01)
*H04W 4/02* (2018.01)
*H04W 4/80* (2018.01)
*H04W 4/04* (2009.01)
*B60L 53/12* (2019.01)
*B60L 53/38* (2019.01)
*B60L 53/60* (2019.01)

(52) U.S. Cl.
CPC ............ *H04W 4/046* (2013.01); *H04W 4/80* (2018.02); *B60L 2240/16* (2013.01); *B60L 2240/60* (2013.01); *B60L 2240/62* (2013.01); *B60L 2240/622* (2013.01); *B60L 2240/72* (2013.01); *B60L 2250/16* (2013.01); *Y02T 10/7005* (2013.01); *Y02T 10/7072* (2013.01); *Y02T 10/7291* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01); *Y02T 90/162* (2013.01); *Y02T 90/163* (2013.01)

(58) Field of Classification Search
CPC ........ H02J 50/90; H04W 4/008; H04W 4/021; H04W 4/023; H04W 4/046
See application file for complete search history.

(56) References Cited

U.S. PATENT DOCUMENTS

| | | | |
|---|---|---|---|
| 5,311,973 A | 5/1994 | Tseng et al. | |
| 5,323,099 A | 6/1994 | Biasotti et al. | |
| 5,327,065 A | 7/1994 | Bruni et al. | |
| 5,461,299 A | 10/1995 | Bruni | |
| 5,463,303 A | 10/1995 | Hall et al. | |
| 5,483,143 A | 1/1996 | Quon et al. | |
| 5,498,948 A | 3/1996 | Davenport et al. | |
| 5,506,489 A | 4/1996 | Abbott et al. | |
| 5,600,222 A | 2/1997 | Woody et al. | |
| 5,606,237 A | 2/1997 | Biasotti et al. | |
| 5,646,500 A | 7/1997 | Wilson et al. | |
| 5,654,621 A | 8/1997 | Seelig et al. | |
| 5,703,462 A | 12/1997 | Woody et al. | |
| 5,831,413 A | 11/1998 | Gould et al. | |
| 5,850,135 A | 12/1998 | Miyazaki et al. | |
| 6,157,162 A | 12/2000 | Hayashi et al. | |
| 6,397,990 B1 | 6/2002 | Brien et al. | |
| 6,879,889 B2 | 4/2005 | Ross et al. | |
| 7,741,734 B2 | 6/2010 | Joannopoulos et al. | |
| 7,825,543 B2 | 11/2010 | Fisher et al. | |
| 7,880,337 B2 | 2/2011 | Farkas | |
| D636,333 S | 4/2011 | Kulikowski et al. | |
| 8,022,576 B2 | 9/2011 | Joannopoulos et al. | |
| 8,035,255 B2 | 10/2011 | Hall et al. | |
| 8,054,036 B2 | 11/2011 | Onishi et al. | |
| 8,072,182 B2 | 12/2011 | Vasilantone et al. | |
| 8,076,800 B2 | 12/2011 | Joannopoulos et al. | |
| 8,076,801 B2 | 12/2011 | Karalis et al. | |
| 8,084,889 B2 | 12/2011 | Joannopoulos et al. | |
| 8,097,983 B2 | 1/2012 | Fisher et al. | |
| 8,106,539 B2 | 1/2012 | Schatz et al. | |
| 8,115,448 B2 | 2/2012 | John | |
| 8,169,185 B2 | 5/2012 | Partovi et al. | |
| 8,183,827 B2 | 5/2012 | Lyon et al. | |
| 8,222,860 B2 | 7/2012 | Kamijo et al. | |
| 8,304,935 B2 | 11/2012 | Hall et al. | |
| 8,324,759 B2 | 12/2012 | Hall et al. | |
| 8,362,651 B2 | 1/2013 | Joannopoulos et al. | |
| 8,395,282 B2 | 3/2013 | Joannopoulos et al. | |
| 8,395,283 B2 | 3/2013 | Joannopoulos et al. | |
| 8,400,017 B2 | 3/2013 | Hall et al. | |
| 8,400,018 B2 | 3/2013 | Joannopoulos et al. | |
| 8,400,019 B2 | 3/2013 | Joannopoulos et al. | |
| 8,400,020 B2 | 3/2013 | Joannopoulos et al. | |
| 8,400,021 B2 | 3/2013 | Joannopoulos et al. | |
| 8,400,022 B2 | 3/2013 | Joannopoulos et al. | |
| 8,400,023 B2 | 3/2013 | Joannopoulos et al. | |
| 8,400,024 B2 | 3/2013 | Joannopoulos et al. | |
| 8,410,636 B2 | 4/2013 | Hall et al. | |
| 8,441,154 B2 | 5/2013 | Karalis et al. | |
| 8,461,719 B2 | 6/2013 | Schatz et al. | |
| 8,461,720 B2 | 6/2013 | Hall et al. | |
| 8,461,721 B2 | 6/2013 | Hall et al. | |
| 8,461,722 B2 | 6/2013 | Hall et al. | |
| 8,463,536 B2 * | 6/2013 | Yamamoto | B60L 11/182 701/300 |
| 8,466,583 B2 | 6/2013 | Karalis et al. | |
| 8,466,654 B2 | 6/2013 | Sieber et al. | |
| 8,466,660 B2 | 6/2013 | Robert et al. | |
| 8,471,410 B2 | 6/2013 | Hall et al. | |
| 8,476,788 B2 | 7/2013 | Hall et al. | |
| 8,482,158 B2 | 7/2013 | Hall et al. | |
| 8,487,480 B1 | 7/2013 | Schatz et al. | |
| 8,497,601 B2 | 7/2013 | Hall et al. | |
| 8,513,915 B2 | 8/2013 | Patel et al. | |
| 8,517,126 B2 | 8/2013 | Atarashi | |
| 8,525,370 B2 | 9/2013 | Walley et al. | |
| 8,536,830 B2 | 9/2013 | Holmes et al. | |
| D692,010 S | 10/2013 | Verghese | |
| 8,552,592 B2 | 10/2013 | Schatz et al. | |
| 8,561,770 B2 | 10/2013 | Stoicoviciu | |
| 8,569,914 B2 | 10/2013 | Hall et al. | |
| 8,569,993 B2 | 10/2013 | Wolfien | |
| 8,751,077 B2 * | 6/2014 | Hiruta | G01C 21/3469 340/995.19 |
| 8,907,811 B2 | 12/2014 | Manniche et al. | |
| 9,187,006 B2 * | 11/2015 | Chen | B60L 11/182 |
| 9,348,381 B2 * | 5/2016 | Khoo | B60L 11/1825 |
| 9,446,674 B2 * | 9/2016 | Halker | B60L 11/1827 |
| 2001/0002788 A1 | 6/2001 | Koike et al. | |
| 2008/0101842 A1 | 5/2008 | Takahashi et al. | |
| 2008/0300660 A1 | 12/2008 | John et al. | |
| 2009/0249076 A1 | 10/2009 | Reed et al. | |
| 2010/0017249 A1 | 1/2010 | Fincham et al. | |
| 2010/0094496 A1 | 4/2010 | Hershkovitz et al. | |
| 2010/0102640 A1 | 4/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0156346 A1 | 6/2010 | Takada et al. | |
| 2010/0161216 A1 * | 6/2010 | Yamamoto | B60L 11/182 701/408 |
| 2010/0171368 A1 | 7/2010 | Schatz et al. | |
| 2010/0181845 A1 | 7/2010 | Fiorello et al. | |
| 2010/0185353 A1 | 7/2010 | Barwick et al. | |
| 2010/0187911 A1 | 7/2010 | Joannopoulos et al. | |
| 2010/0207458 A1 | 8/2010 | Joannopoulos et al. | |
| 2010/0219694 A1 | 9/2010 | Kurs et al. | |
| 2010/0231340 A1 | 9/2010 | Fiorello et al. | |
| 2010/0237709 A1 | 9/2010 | Hall et al. | |
| 2010/0259108 A1 | 10/2010 | Giler et al. | |
| 2010/0259110 A1 | 10/2010 | Kurs et al. | |
| 2010/0277121 A1 | 11/2010 | Hall et al. | |
| 2010/0308939 A1 | 12/2010 | Kurs et al. | |
| 2011/0043049 A1 | 2/2011 | Karalis et al. | |
| 2011/0074218 A1 | 3/2011 | Karalis et al. | |
| 2011/0074346 A1 | 3/2011 | Hall et al. | |
| 2011/0074347 A1 | 3/2011 | Karalis et al. | |
| 2011/0078092 A1 | 3/2011 | Kim et al. | |
| 2011/0089895 A1 | 4/2011 | Karalis et al. | |
| 2011/0095618 A1 | 4/2011 | Schatz et al. | |
| 2011/0121920 A1 | 5/2011 | Kurs et al. | |
| 2011/0156494 A1 | 6/2011 | Mashinsky et al. | |
| 2011/0193416 A1 | 8/2011 | Campanella et al. | |
| 2011/0193419 A1 | 8/2011 | Karalis et al. | |
| 2011/0204845 A1 | 8/2011 | Paparo et al. | |
| 2011/0221387 A1 | 9/2011 | Steigerwald et al. | |
| 2011/0224900 A1 * | 9/2011 | Hiruta | G01C 21/3469 701/533 |

(56) References Cited

U.S. PATENT DOCUMENTS

| | | |
|---|---|---|
| 2011/0254503 A1 | 10/2011 | Widmer et al. |
| 2011/0285349 A1 | 11/2011 | Widmer et al. |
| 2012/0007441 A1 | 1/2012 | John et al. |
| 2012/0032522 A1 | 2/2012 | Schatz et al. |
| 2012/0049795 A1 | 3/2012 | Dougherty et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0098483 A1 | 4/2012 | Patel |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0153733 A1 | 6/2012 | Schatz et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0203410 A1 | 8/2012 | Wechlin et al. |
| 2012/0206096 A1 | 8/2012 | John et al. |
| 2012/0228960 A1 | 9/2012 | Karalis et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235505 A1 | 9/2012 | Schatz et al. |
| 2012/0235633 A1 | 9/2012 | Kesler et al. |
| 2012/0235634 A1 | 9/2012 | Hall et al. |
| 2012/0235636 A1 | 9/2012 | Partovi |
| 2012/0239117 A1 | 9/2012 | Kesler et al. |
| 2012/0248888 A1 | 10/2012 | Kesler et al. |
| 2012/0256494 A1 | 10/2012 | Kesler et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0024059 A1 | 1/2013 | Miller et al. |
| 2013/0033118 A1 | 2/2013 | Karalis et al. |
| 2013/0033224 A1 | 2/2013 | Raedy et al. |
| 2013/0033228 A1 | 2/2013 | Raedy et al. |
| 2013/0038276 A1 | 2/2013 | Raedy et al. |
| 2013/0038277 A1 | 2/2013 | Chan et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0088195 A1 | 4/2013 | Yoon et al. |
| 2013/0099587 A1 | 4/2013 | Lou et al. |
| 2013/0110296 A1* | 5/2013 | Khoo .................. B60L 11/1825 700/286 |
| 2013/0154389 A1 | 6/2013 | Kurs et al. |
| 2013/0159956 A1 | 6/2013 | Verghese et al. |
| 2013/0181541 A1 | 7/2013 | Karalis et al. |
| 2013/0193913 A1 | 8/2013 | Takada et al. |
| 2013/0234532 A1 | 9/2013 | Fells et al. |
| 2013/0249479 A1 | 9/2013 | Partovi et al. |
| 2013/0265004 A1 | 10/2013 | Iizuka et al. |
| 2013/0278073 A1 | 10/2013 | Kurs et al. |
| 2013/0278074 A1 | 10/2013 | Kurs et al. |
| 2013/0278210 A1 | 10/2013 | Cook et al. |
| 2013/0285604 A1 | 10/2013 | Partovi et al. |
| 2013/0300364 A1 | 11/2013 | Baier et al. |
| 2014/0021908 A1 | 1/2014 | McCool et al. |
| 2014/0194092 A1 | 7/2014 | Wanstedt et al. |
| 2015/0015419 A1* | 1/2015 | Halker ................ B60L 11/1827 340/901 |
| 2015/0061576 A1* | 3/2015 | Chen .................... B60L 11/182 320/108 |
| 2015/0175025 A1 | 6/2015 | Barbul et al. |

\* cited by examiner

PARKING ALIGNMENT SEQUENCE FOR WIRELESSLY CHARGING AN ELECTRIC VEHICLE

TECHNICAL FIELD

The present disclosure relates generally to wirelessly charging an electric vehicle, and more particularly (although not necessarily exclusively), to a parking alignment sequence for wirelessly charging an electric vehicle.

BACKGROUND

One alternative to traditional vehicles is electrically powered vehicles. Electric vehicles use one or more electric motors, typically powered by batteries for propulsion. The batteries can be charged by one or more sources of electricity. In some aspects, electric vehicles can be plugged in to a specially designed outlet to receive power for charging the batteries. In additional or alternative aspects, electric vehicles can be wirelessly charged at a charging station.

SUMMARY

The present disclosure describes devices, systems, and methods for a parking alignment sequence for wirelessly charging an electric vehicle.

In some aspects, a method is provided. The method can involve determining a location of a charging station based on communication over a cellular network using a processing device of a user device. The charging station can have a transmitter for wirelessly transmitting power to a receiver of an electric vehicle for charging the electric vehicle. The method can further include displaying a first user interface by the processing device. The first user interface can have directions to the charging station from a current location of the user device. The method can further include the processing device receiving alignment data wirelessly from the charging station via a communication path that is independent of the cellular network in response to the electric vehicle being located within a predetermined distance from the charging station. The method can further include the processing device displaying a second user interface having alignment instructions for moving the electric vehicle into alignment based on the alignment data in response to the electric vehicle being located within the predetermined distance from the charging station.

In other aspects, a system is provided. The system can include a processing device of a user device and a memory device. The memory device can include instructions for causing the processing device to determine a location of a charging station based on communication over a cellular network. The charging station can have a transmitter for wirelessly transmitting power to a receiver of an electric vehicle for charging the electric vehicle. The memory device can further include instructions for causing the processing device to display a first user interface having directions to the charging station from a current location of the user device. The memory device can further include instructions for causing the processing device to receive alignment data wirelessly from the charging station via a communication path that is independent of the cellular network in response to the electric vehicle being located within a predetermined distance from the charging station. The memory device can further include instructions for causing the processing device to display a second user interface having alignment instructions for moving the electric vehicle into alignment based on the alignment data in response to the electric vehicle being located within the predetermined distance from the charging station.

In other aspects, a non-transitory computer-readable medium is provided. The non-transitory computer-readable medium can include instructions executable by a processing device of a user device for causing the processing device to determine a location of a charging station based on communication over a cellular network. The charging station can have a transmitter for wirelessly transmitting power to a receiver of an electric vehicle for charging the electric vehicle. The non-transitory computer-readable medium can include further instructions executable by a processing device for causing the processing device to display a first user interface having directions to the charging station from a current location of the user device. The non-transitory computer-readable medium can include instructions executable by a processing device for causing the processing device to receive alignment data wirelessly from the charging station via a communication path that is independent of the cellular network in response to the electric vehicle being located within a predetermined distance from the charging station. The non-transitory computer-readable medium can include instructions executable by a processing device for causing the processing device to display a second user interface having alignment instructions for moving the electric vehicle into alignment based on the alignment data in response to the electric vehicle being located within the predetermined distance from the charging station.

The details of one or more aspects and examples are set forth in the accompanying drawings and the description below. Other features and aspects will become apparent from the description, the drawings, and the claims.

DETAILED DESCRIPTION

Figure 1:
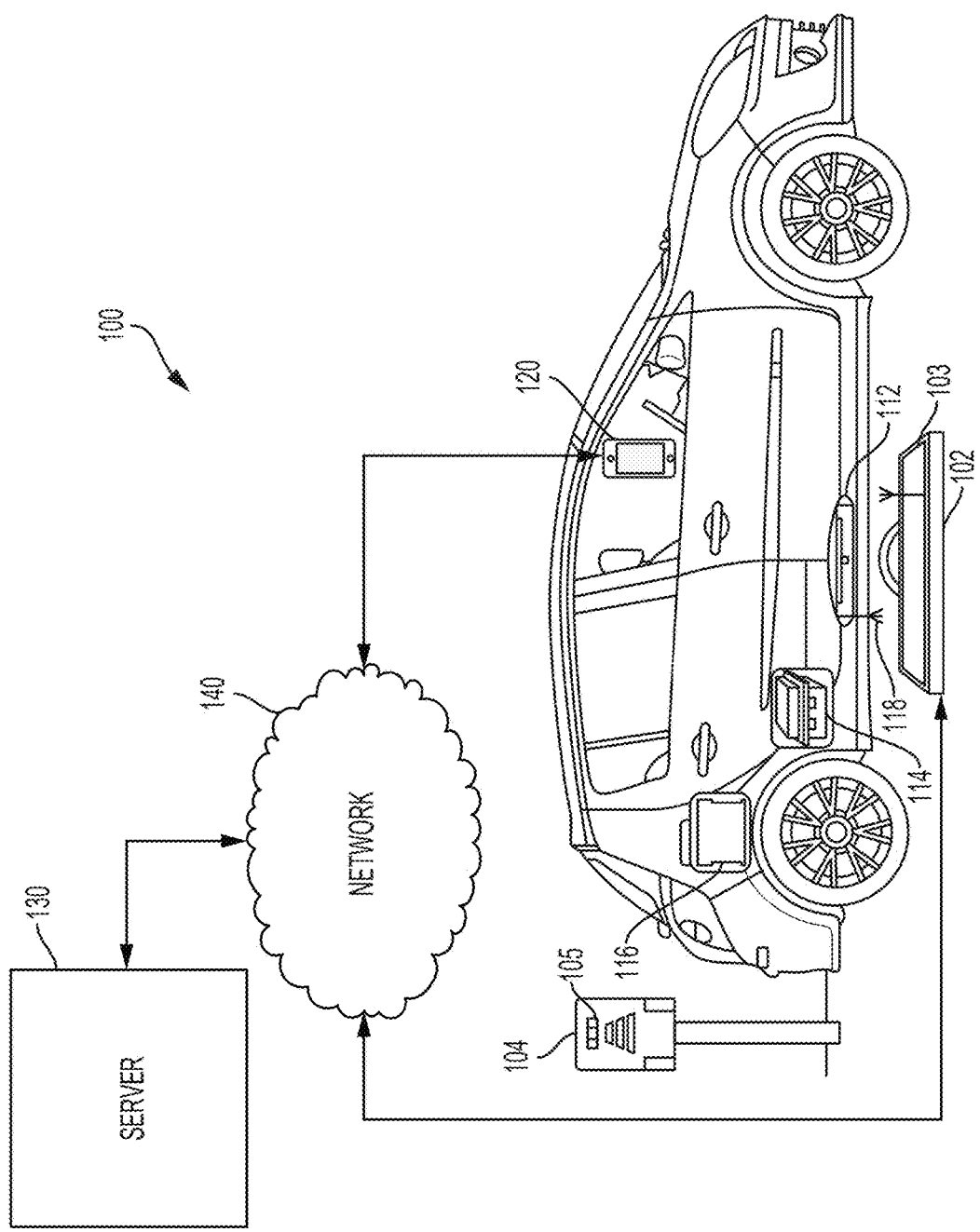
FIG. 1 is a schematic diagram of an example of a wireless charging system for an electric vehicle according to one aspect of the present disclosure.

Certain aspects and features relate to a parking alignment sequence for charging an electric vehicle, in which a system switches between methods of determining, communicating, and displaying alignment data as the electric vehicle approaches the charging station. A parking alignment sequence can be a process for navigating an electric vehicle to a charging station, aligning a receiver of the electric vehicle with a transmitter of the charging station, and performing a charging session. In some aspects, a device associated with the electric vehicle can determine a location of a charging station and determine directions to the charging station based on communication with a server over a cellular network. The device can display a user interface for providing the directions from a current location of the electric vehicle to the charging station. The device can automatically begin communicating with the charging station over a non-cellular network in response to the electric vehicle being within a predetermined distance of the charging station. The device can also automatically switch to displaying a different user interface for facilitating alignment of the receiver in the electric vehicle with the transmitter in the charging station based in response to the electric vehicle being within the predetermined distance of the charging station.

In some aspects, the current location of the electric vehicle can be determined using data from a global positioning system ("GPS"). The device can communicate over a cellular network or an internet network with a server associated with the charging station based on the device being a predetermined distance (e.g., more than 50 meters) from the charging station. The device can communicate with the charging station over a short-range wireless communication protocol when the electric vehicle is within the predetermined distance from the charging station. Examples of short-range wireless communication protocols can include Bluetooth, ZigBee, Dedicated Short-Range Communications ("DSRC"), ANT, and WiFi.

The parking alignment sequence can provide more accurate instructions for moving the electric vehicle into alignment by switching between communication paths based on the position of the electric vehicle relative to the charging station. In some examples, the switch in communication paths can reduce the latency between detecting a position of the car and providing instructions to position the car. In some aspects, the parking alignment sequence can also include switching between reference points for measurements based on the position of the electric vehicle. For example, the parking alignment sequence can switch between basing measurements off the position of the device, basing measurements off the position of the electric vehicle, and basing measurements off the position of the receiver. In additional or alternative aspects, the parking alignment sequence can include switching between user interfaces that are displayed for moving the vehicle into alignment based on the location of the electric vehicle. The different user interfaces can provide specialized visual displays for assisting in the stages of the parking alignment sequence including navigating to the charging station, aligning the transmitter with the receiver, and the charging session.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic diagram of a wireless charging system 100 for an electric vehicle. The wireless charging system 100 can include a transmitter 102 as part of a charging station for wirelessly transmitting power to a receiver 112. The transmitter 102 can include a primary coil for generating an electromagnetic field that can produce a voltage at the receiver 112. In some aspects, the transmitter 102 can be positioned flush with a driving surface. In additional or alternative aspects, the transmitter 102 can be positioned below the driving surface, positioned such that the transmitter 102 extends from the driving surface, positioned on a wall adjacent to the driving surface, or suspended above the driving surface. In additional or alternative aspects, the transmitter 102 can include LEDs 103 for conveying information to a user of the electric vehicle. In some examples, the LEDs 103 can activate at a predetermined rate, color, or pattern to indicate the transmitter 102 is available for charging the receiver 112. In additional or alternative examples, the LEDs 103 can signal to a user that the transmitter 102 is reserved for the receiver 112. In additional or alternative aspects, the transmitter 102 can include a communication device (e.g., a radio or Bluetooth transmitter) for transmitting alignment data.

The receiver 112 can be communicatively coupled to a battery management system ("BMS") 114 of an electric vehicle. The power received by the receiver 112 can be transmitted to the BMS 114 for charging a battery 116 of the electric vehicle. In some examples, the BMS 114 can be hardwired to the battery 116 and receiver 112. In additional or alternative examples, the BMS 114 can wirelessly receive the power from the receiver 112 or wirelessly transmit the power to the battery 116.

The wireless charging system 100 can also include a mobile device 120. The wireless charging system 100 can also include a server 130 that can be communicatively coupled to the transmitter 102 and the mobile device 120 by a network 140 (e.g., a cellular network and an internet network). The wireless charging system 100 can also include an inverter enclosure 104 that can indicate an availability of the transmitter 102. In some examples, the mobile device 120 can communicate with the server 130 to determine the availability of the transmitter 102 and make reservations to use the transmitter 102.

In some aspects, the inverter enclosure 104 can include LEDs 105 that can indicate a status of the transmitter 102. In some examples, the LEDs 105 can indicate the transmitter 102 is available for charging the receiver 112 by activating at a predetermined rate, color, or pattern. In additional or alternative aspects, the LEDs 105 can assist alignment of the vehicle by signaling a direction the vehicle should move to improve the alignment of the transmitter 102 with the receiver 112. For example, each of the LEDs 105 can correspond to a direction (e.g., left, right, and forward) and activate to indicate the vehicle should move in that direction. Each of the LEDs 105 can change colors (e.g., from red to green) to indicate how far the receiver 112 is from alignment. In additional or alternative aspects, the LEDs 104 can indicate the progress of a charging the receiver 112. For example, the number of LEDs 104 activated and the color of the LEDs 104 can indicate the progress of charging the receiver 112.

In some aspects, the inverter enclosure 104 can include a high frequency inverter, a communications gateway, and an input power controller. For example, the inverter enclosure 104 can include an EMI filter, a power supply, an input meter, a circuit breaker, a gateway controller, an inverter, a primary side power stage, a primary side power controller, transformers, an intercell, an output, and a heat sink.

In some aspects, the mobile device 120 that can be a user device associated with a user associated with the electric vehicle. In additional or alternative aspects, the mobile device 120 can be built into the electric vehicle. The mobile device 120 can be communicatively coupled to the receiver 112 or BMS 114 using a short-range wireless communication protocol. In some aspects, the mobile device 120 can be communicatively coupled to the transmitter 102 using a short-range wireless communication protocol in response to the electric vehicle being within a threshold distance of the charging station.

The transmitter 102 and the receiver 112 can be communicatively coupled to (or include) low frequency antennas 118. The low frequency antennas 118 can generate a voltage based on strength of a surrounding electromagnetic field. In some examples, the low frequency antennas 118 are coupled to both the receiver 112 and the transmitter 102 such that the low frequency antennas 118 generate substantially the same amount of voltage in response to an electromagnetic field generated by the transmitter 102 when the transmitter 102 and receiver 112 are aligned. The mobile device 120 can receive electromagnetic field data from the low frequency antennas 118 and determine alignment data for the electric vehicle based on the electromagnetic field data.

Although FIG. 1 depicts the wireless charging system 100 for charging a user-controlled vehicle, a wireless charging system can be used to charge an autonomous vehicle. An autonomous vehicle can receive information regarding available transmitters over a cellular network. The autonomous vehicle can transmit a signal to the charging system to reserve an available transmitter. The autonomous vehicle can use the information received to determine and navigate a route to the available transmitter. Once the autonomous vehicle is within a predetermined range of the transmitter 102, the autonomous vehicle can receive alignment data and analyze the alignment data to determine movements that can position the autonomous vehicle such that a receiver in the autonomous vehicle is aligned with the available transmitter. The autonomous vehicle can execute the movements and determine the transmitter is in alignment with the receiver. In some examples, the autonomous vehicle can receive a signal indicating the receiver and transmitter are aligned from the transmitter. The autonomous vehicle can request the transmitter charge the receiver, monitor the charging progress, and request the charging process stop after a threshold value is met.

Figure 2:
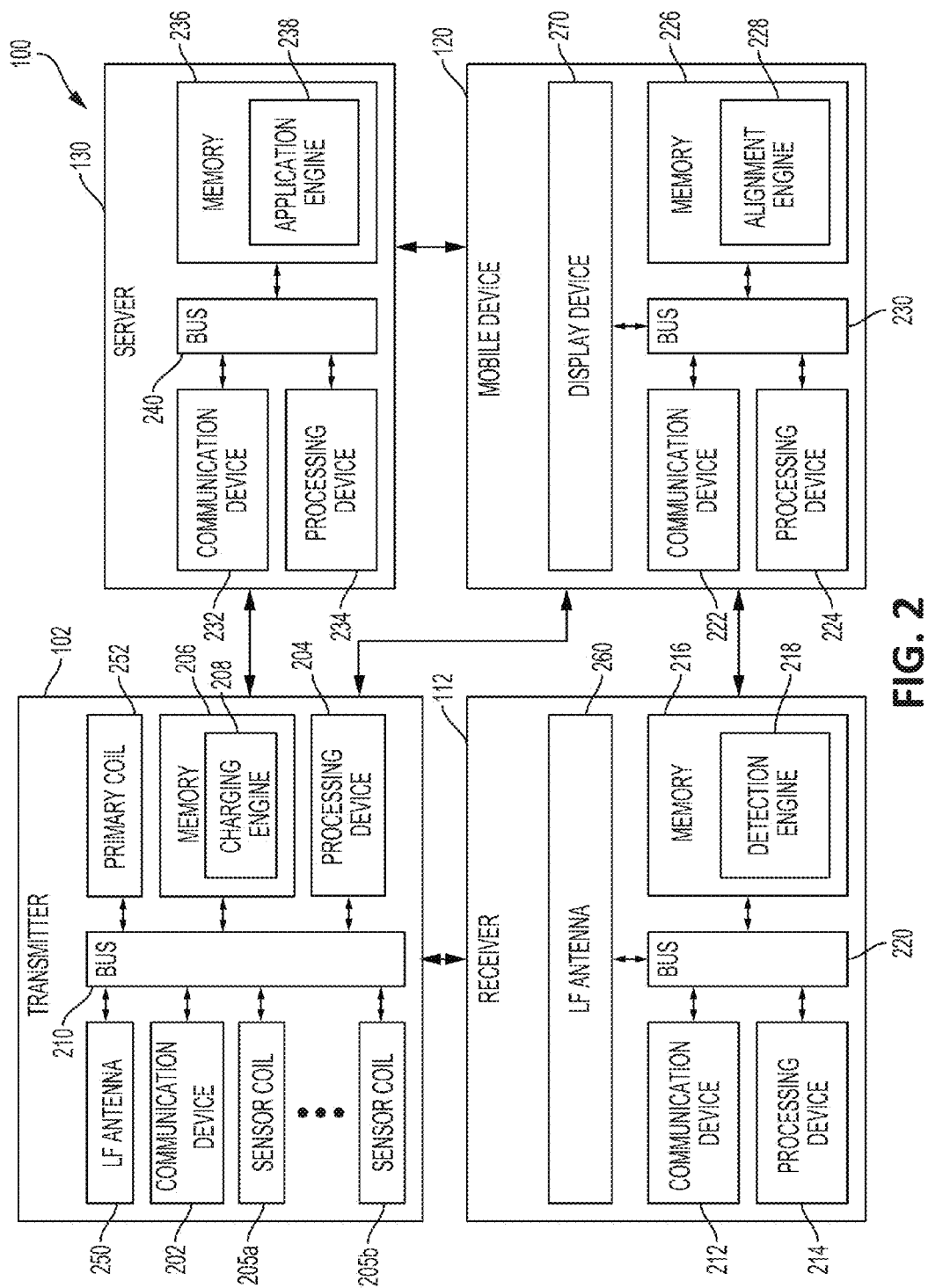
FIG. 2 is a block diagram of a wirelessly charging system for an electric vehicle according to one aspect of the present disclosure.

FIG. 2 is a block diagram of the wireless charging system 100 in FIG. 1 according to one example. The wireless charging system 100 can include a transmitter 102, a receiver 112, a mobile device 120, and a server 130.

The transmitter 102 can include a communication device 202, a processing device 204, a memory 206, a low frequency antenna 250, a primary coil 252, and sensor coils 205a-b. Each component of the transmitter 102 can be communicatively coupled by a bus 210. The communication device 202 can communicatively couple to the server 130 over a cellular network. The communication device 202 can also communicatively couple to the receiver 112 and the mobile device 120 over the cellular network, a short-range wireless communication protocol, or any other suitable communication method.

The sensor coils 205a-b can be positioned for measuring a location of the receiver 112. In some examples, the primary coil 252 can be activated to a lower power state (e.g., 40 W) in response to determining the receiver 112 is within a predetermined distance (e.g., 25 meters) from the transmitter 102. As the receiver 112 is positioned in the electromagnetic field generated by the primary coil 252, a voltage can be induced on each sensor coil 205a-b. The difference in voltage induced on each sensor coil can be used to determine the location of the receiver 112. For example, if a voltage induced on sensor coil 205a is larger than the voltage induced on sensor coil 205b then the receiver 112 can be closer to sensor coil 205a than 205b. In some examples, the sensor coils 205a-b can be positioned less than 5 mm above (e.g., closer to the driving surface) the transmitter 102. Although the transmitter in FIG. 2 depicts two sensor coils 205a-b, a transmitter can include more than two sensor coils and each can be positioned to provide more precise directional data indicating the location of the receiver 112 relative to the transmitter 102. In some examples, each sensor coil can be individually activated to reduce the impact of one sensor on the other sensor coils.

In some aspects, the communication device 202 can include (or be communicatively coupled to) a radio for transmitting FM or AM signals to another radio included in (or communicatively coupled to) the receiver 112. The radio can transmit signals based on location data from the sensor coils 205a-b. In some examples, the communication device 202 can transmit radio or other short-range signals (e.g., Bluetooth) to a communication system in a vehicle for instructing the vehicle to provide voice or visual instructions to a user. The instructions can facilitate alignment of the transmitter 102 with the receiver 112.

The primary coil 252, in the lower power state, can also induce a voltage on the receiver 112. The voltage induced on the receiver 112 can be used to determine the location of the receiver 112. For example, the magnitude of the voltage induced on the receiver 112 can indicate the distance of the receiver 112 from the transmitter 102. In response to alignment of the receiver 112 with the transmitter 102, the primary coil 252 can be increased to a higher power state for efficiently transferring power to the receiver 112.

The processing device 204 can execute program code stored in the memory 206. Examples of the processing device 204 can include a microprocessor, an application-specific integrated circuit ("ASIC"), a field-programmable gate array ("FPGA"), or other suitable processing device. The processing device 204 can include (or be communicatively coupled to) a non-transitory computer readable memory 206. The memory 206 can include one or more memory devices that can store program instructions. The program instructions can include, for example, a charging engine 208 that is executable by the processing device 204 to perform certain operations described herein. For example, the operations can include activating the primary coil 252 to produce an electromagnetic field that can wirelessly transfer power to the receiver 112. In additional or alternative examples, the operations can include determining a location of the receiver 112 relative to the transmitter 102 based on analyzing the data from the sensor coils 205a-b.

The low frequency antenna 250 can detect the electromagnetic field produced by the primary coil 252 and generate a voltage based on the strength of the electromagnetic field at the position of the low frequency antenna 250.

The receiver 112 can include a communication device 212, a processing device 214, a memory 216, and a low frequency antenna 260, each of which can be communicatively coupled by a bus 220. The communication device 212 can communicatively couple to the server 130 over a cellular network. The communication device 212 can also communicatively couple to the transmitter 102 and the mobile device 120 over the cellular network, a short-range wireless communication protocol, or any other suitable communication method.

In some aspects, the communication device 212 can include (or be communicatively coupled to) a radio for receiving FM or AM radio signals from the transmitter 102. The radio can be tuned to a particular frequency broadcast by the transmitter 102 and provide oral instructions to a user for aligning the receiver with the transmitter 102 based on the receiving alignment data from the transmitter 102. In some examples, the particular frequency can be displayed to the user by the mobile device 120.

The processing device 214 can include (or be communicatively coupled to) a non-transitory computer readable memory 216. The memory 216 can include one or more memory devices that can store program instructions. The program instructions can include, for example, a detection engine 218 that is executable by the processing device 214 to perform certain operations described herein. For example, the operations can include detecting the electromagnetic field with the low frequency antenna 260. The difference in voltage generated by the low frequency antenna 250 coupled to the transmitter 102 and the voltage generated by the low frequency antenna 260 coupled to the receiver 112 can be used to determine alignment data for the electric vehicle.

The mobile device 120 can include a communication device 222, a processing device 224, a memory 226, and a display device 270. A bus 230 can communicatively couple the components. The communication device 222 can communicatively couple to the server 130 over a cellular network. The communication device 222 can also communicatively couple to the receiver 112 and the transmitter 102 over the cellular network, a short-range wireless communication protocol, or any other suitable communication method.

The processing device 224 can include (or be communicatively coupled to) a non-transitory computer readable memory 226. The memory 226 can include one or more memory devices that can store program instructions. The program instructions can include, for example, an alignment engine 228 that is executable by the processing device 224 to perform certain operations described herein. For example, the operations can include displaying different user interfaces on the display device 270 based on the distance the electric vehicle is from the charging station.

The server 130 can include a communication device 232, a processing device 234, and a memory 236. A bus 240 can communicatively couple the components 232, 234, 236. The communication device 232 can communicatively couple to the transmitter 102, the receiver 112, and the mobile device 120 over a cellular network.

The processing device 234 can include (or be communicatively coupled to) a non-transitory computer readable memory 236. The memory 236 can include one or more memory devices that can store program instructions. The program instructions can include, for example, an application engine 238 that is executable by the processing device 234 to perform certain operations described herein.

Figure 3:
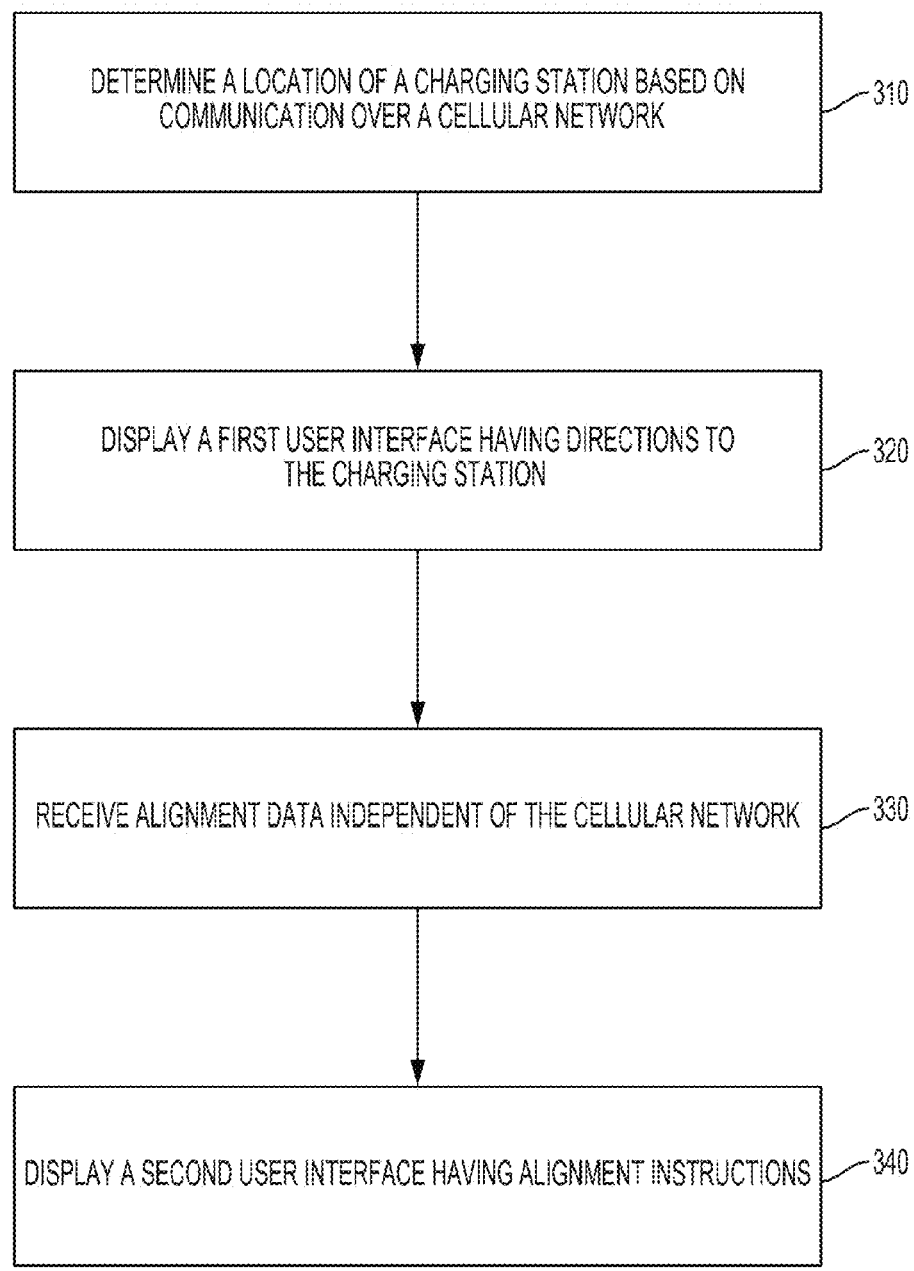
FIG. 3 is a flowchart of an example of a process for aligning an electric vehicle with a charging station according to one aspect of the present disclosure.

FIG. 3 is a flow chart of an example of a process for providing a parking alignment sequence for wirelessly charging an electric vehicle using the wireless charging system 100 in FIGS. 1-2.

In block 310, the mobile device 120 can determine a location of the charging station based on communication over a cellular network. The mobile device 120 can communicate with the server 130 to determine addresses or coordinates of the charging station. The charging station can include transmitter 102 for wirelessly transmitting power to receiver 112 of the electric vehicle for charging the electric vehicle.

In block 320, a first user interface is displayed having directions to the charging station. The first user interface can be displayed by the display device 270 of the mobile device 120 associated with the electric vehicle. In some examples, the directions can include a route from the current location of the electric vehicle to the charging station. The mobile device 120 can periodically update the current location of the electric vehicle and the first user interface can provide a zoomed in version of the map and route as the electric vehicle approaches the charging station.

In some aspects, the processing device 224 in the mobile device 120 can determine the directions based on the location of the charging station and a current location of the mobile device 120. The current location of the mobile device 120 can be determined using GPS or based on connections to wireless networks. In additional or alternative aspects, the mobile device 120 can receive the directions from the server 130.

In block 330, alignment data is received independent of the cellular network. The alignment data can be received by the mobile device 120 independent of the cellular network in response to the electric vehicle being located within a predetermined distance from the charging station. In some examples, a short-range wireless communication protocol (e.g., ZigBee) can allow for communication between the mobile device 120 and the transmitter 102. In additional or alternative examples, alignment data can be received as an analog radio signal.

The transmitter 102 can perform a handshake function with the mobile device 120 and the receiver 112 to regulate subsequent transfer of data. In some aspects, the handshake can be performed through the cellular network. In additional or alternative aspects, the handshake can be performed over the short-range wireless communication protocol. Another short-range wireless communication protocol (e.g., Bluetooth) can allow the transmitter 102 and the receiver 112 to communicate.

In some aspects, a signal can be transmitted from the charging station to the server 130 indicating a strength of the short-range wireless communication between the transmitter 102 and the mobile device 120 is above a threshold level. The server 130 can transmit a cellular signal to the mobile device 120 indicating the mobile device 120 can open a different communication path with the transmitter. For example, the mobile device 120 can initiate a TCP socket server and establish a connection with the transmitter 102.

In block 340, a second user interface is displayed having alignment instructions. The second user interface can be displayed by the display device 270 and include a parking alignment interface for moving the electric vehicle into alignment based on the received alignment data. The processing device 224 of the mobile device 120 can determine the alignment instructions based on the alignment data. In some aspects, the alignment instructions can include a visual indicator that changes shape or color to indicate how to improve alignment. The second user interface can replace the first user interface in response to the electric vehicle being located within a predetermined distance (e.g., 5 m or 25 m) from the charging station.

Figure 4:
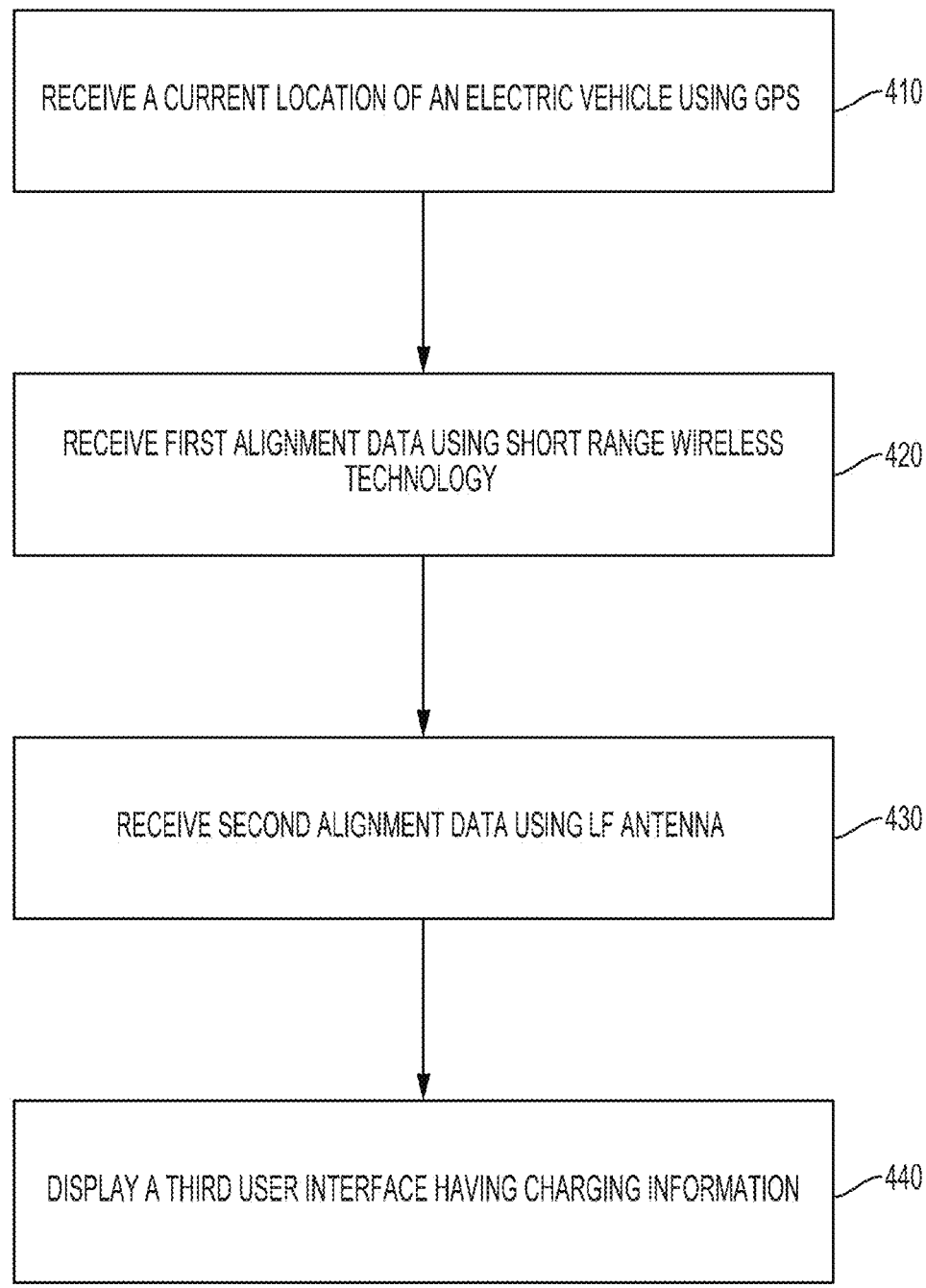
FIG. 4 is a flowchart of an example of a process for communicating alignment information using different communication methods based on proximity of the electric vehicle to the charging station according to one aspect of the present disclosure.

FIG. 4 is a flowchart of an example of a process for communicating different alignment information using different communication methods based on a proximity of the electric vehicle to the charging station using the wireless charging system 100 in FIGS. 1-2.

In block 410, a current location of the electric vehicle is received using a global positioning system ("GPS"). The mobile device 120 can receive the current location of the electric vehicle using communication device 222. In some examples, block 410 can be an example of a process for determining the current location of the electric vehicle in block 310 of FIG. 3.

In block 420, first alignment data is received using short-range wireless technology. In some examples, the first alignment data can be received from the transmitter 102 by the mobile device 120 via a TCP socket server. In additional or alternative examples, the first alignment data can be received by the mobile device 120 from the receiver 112. The first alignment data can be used by the processing device 224 to provide alignment instructions via a user interface displayed by display device 270.

In block 430, second alignment data based on low frequency antennas 250, 260 can be received. In some aspects, a connection can be made between the transmitter 102, the receiver 112, and the mobile device 120 in response to the electric vehicle moving to within a predetermined distance of the charging station. The transmitter 102 and the receiver 112 can begin sending data based on measurements from the low frequency antennas 250, 260 directly to the mobile device 120.

The processing device 224 in mobile device 120 can use the data to determine an x-y position through trilateration and constantly loop the changing antenna values (e.g., measured in mV) to precisely distinguish the location of the receiver 112 in relation to the transmitter 102.

In block 440, a third user interface is displayed having charging information. The third user interface can be displayed by the display device 270 and indicate that the electric vehicle is aligned with the charging station. In some aspects, the third user interface can be displayed in response to the receiver 112 being positioned within a threshold distance of a position, in which the receiver 112 can obtain 95% or greater efficiency in receiving power wirelessly from the transmitter 102. In additional or alternative aspects, alignment can be determined based on the mobile device 120 determining that the difference in signal strength between the low frequency antennas 250, 260 is less than a threshold amount (e.g., 200 mV). In some examples, alignment can be within five centimeters from perfect alignment.

The charging information can include an ability to start the charging process. In some aspects, the third user interface can display an icon (e.g., a green thumb) that can be tapped to initiate the charging process. In additional or alternative aspects, the charging process can begin after a predetermined period of time in alignment. The charging information can also include real-time information about the charging session including a receiver voltage, a receiver current, a number of kilowatt-hours, a time spent charging, the location of the charging station, an amount of money charged, or a charging efficiency.

FIGS. 5-9 are screenshots of an example of a first type of user interface 500, 600, 800, 900 according to one example. The user interfaces 500, 600, 800, 900 can be displayed on a user device, such as the mobile device 120 in FIGS. 1-2, for use by a user that is associated with an electric vehicle. In some examples, a user that is associated with an electric vehicle can be a driver or passenger of the electric vehicle. In additional or alternative examples, the electric vehicle can be a smart electric vehicle (e.g., a self-driving car) and the user can be a processing device or program for controlling the smart electric vehicle.

Figure 5:
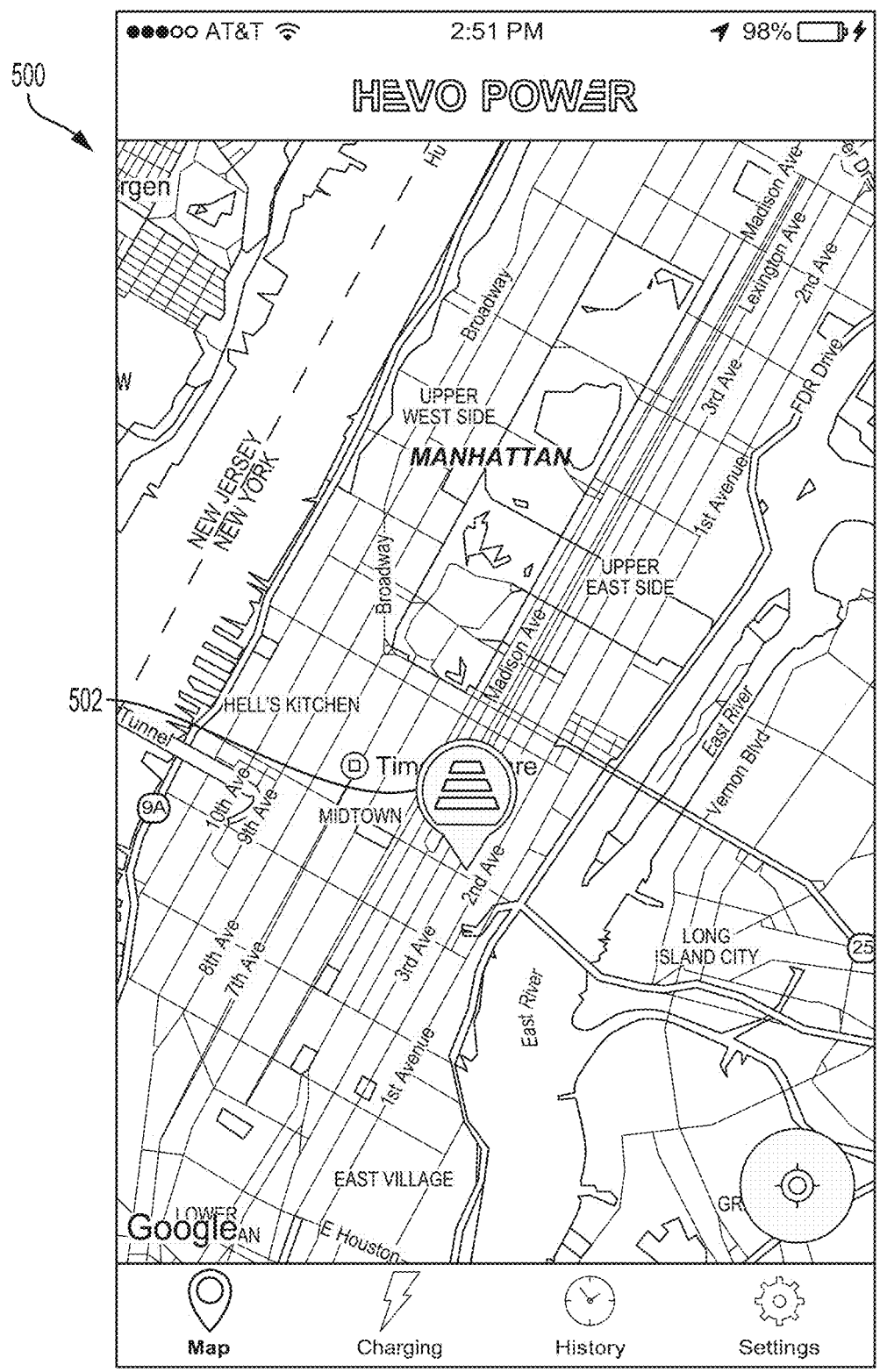
FIG. 5 is a screenshot of an example of a user interface for locating a charging station according to one aspect of the present disclosure.

In FIG. 5, the user interface 500 can display a location 502 of a charging station. The charging station can be the closest charging station or the closest charging station with an available transmitter to the user device or the electric vehicle. In some aspects, the user interface 500 can display the location 502 of one or more charging stations. For example, the user interface 500 may display the location 502 of all charging stations within a 500-meter radius or within a 500-meter drive of a current location of the electric vehicle. The current location of the electric vehicle can be determined using GPS or processing cellular network signals. In additional or alternative examples, the user interface 500 may display the location of a charging station within a 500-meter drive of a planned route.

Figure 6:
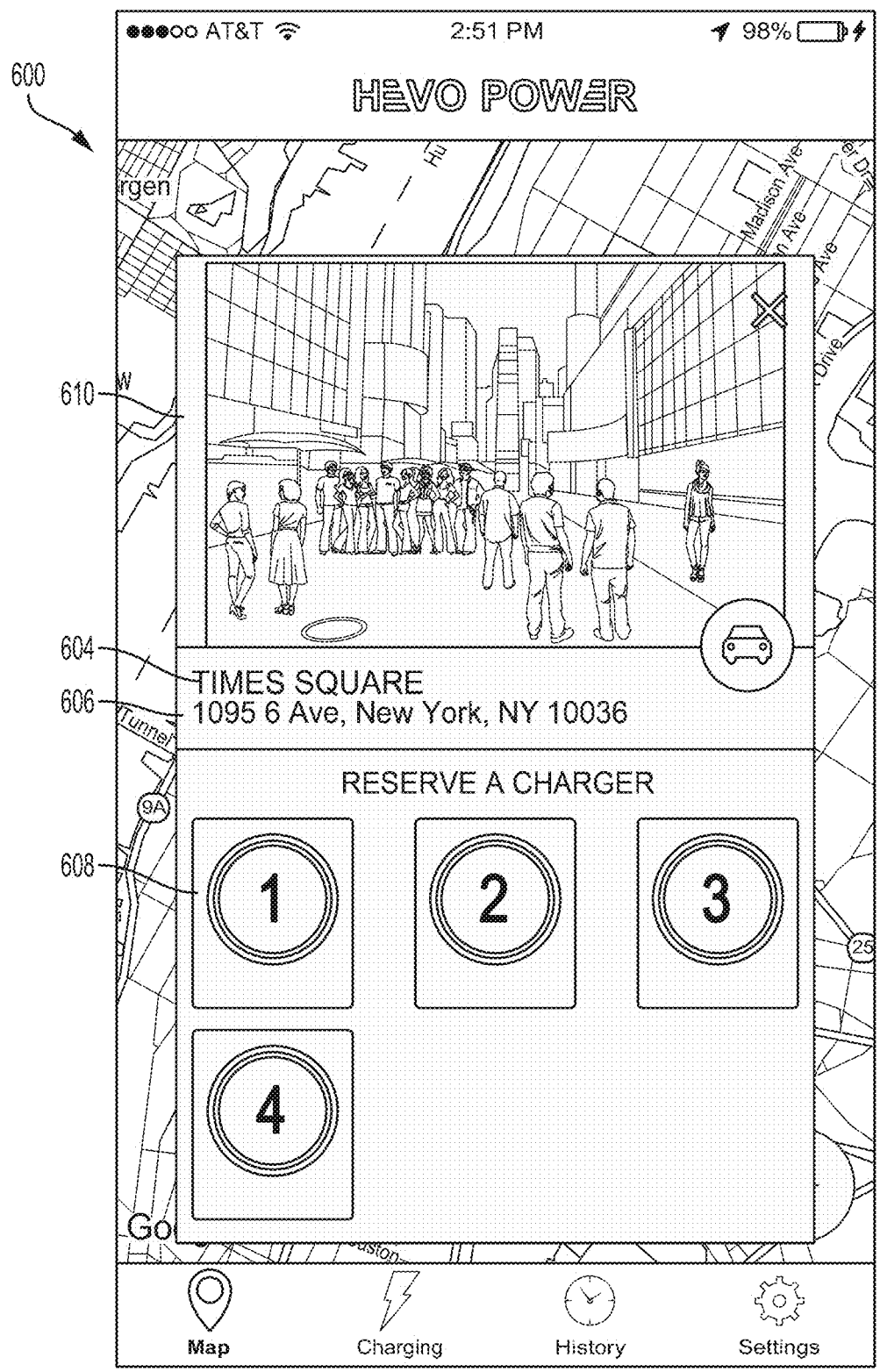
FIG. 6 is a screenshot of an example of a user interface for determining an availability of a transmitter at a charging station according to one aspect of the present disclosure.
Figure 7:
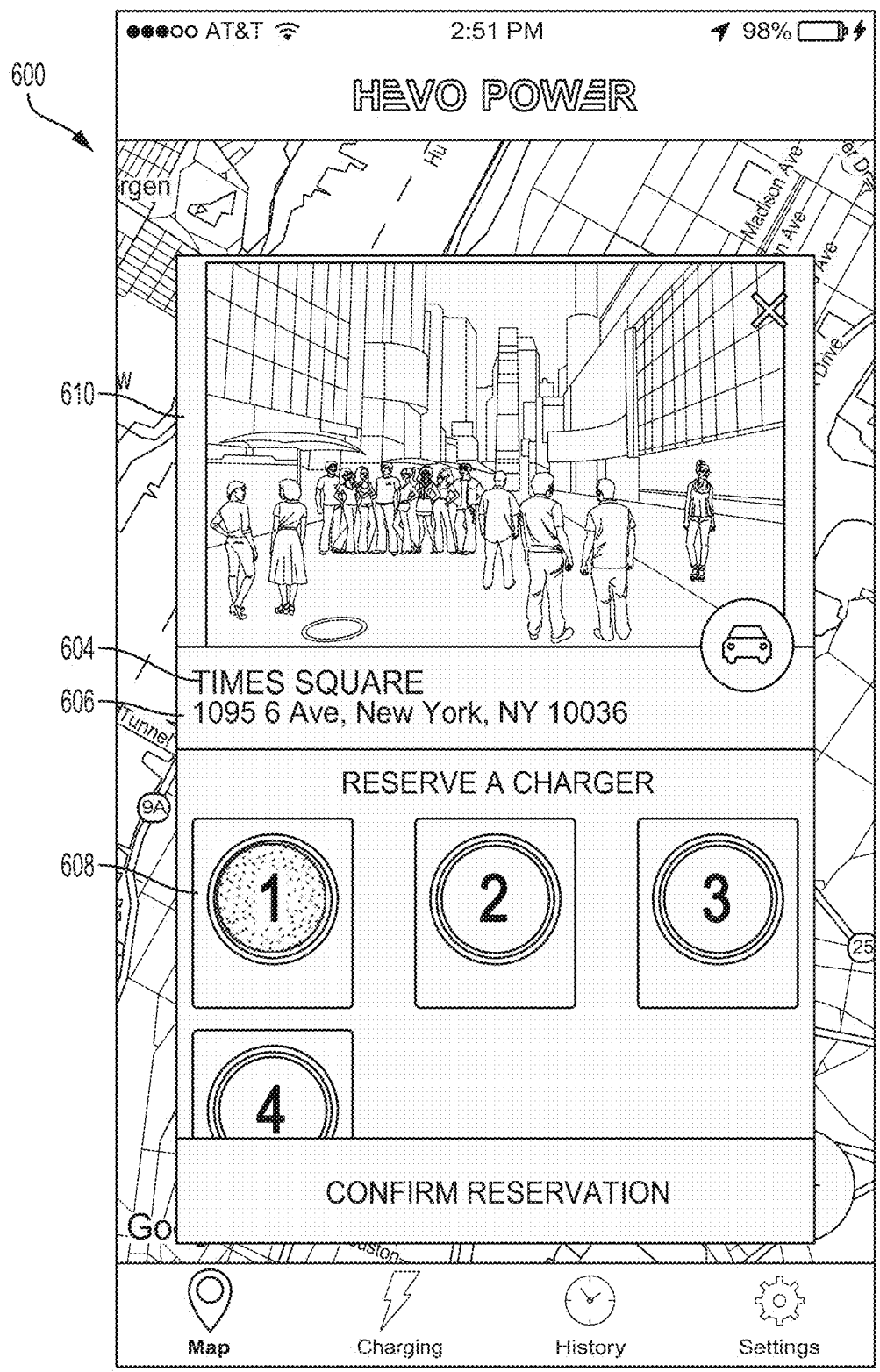
FIG. 7 is a screenshot of an example of a user interface for reserving an available transmitter at a charging station according to one aspect of the present disclosure.

In FIGS. 6-7, the user interface 600 displays a window 610 according to some examples. The window 610 shows an availability of a transmitter at the charging station and allowing a reservation to be made. The window 610 can be shown in response to the location 502 being selected. The window 610 can include a name 604 of the charging station and an address 606 of the charging station. The user interface 600 can further include an icon 608 for each transmitter at the charging station. The icon 608 can include a number identifying the associated transmitter from among the other transmitters at the charging station. The icon 608 can indicate the availability of a transmitter based on a color, a shape, a size, or another suitable characteristic. In some examples, tapping on an available transmitter can reserve the transmitter. In additional or alternative examples, a transmitter can be reserved for a specific time. The time can be requested by the user or the time can be based on an expected travel time for the electric vehicle to reach the transmitter.

Figure 8:
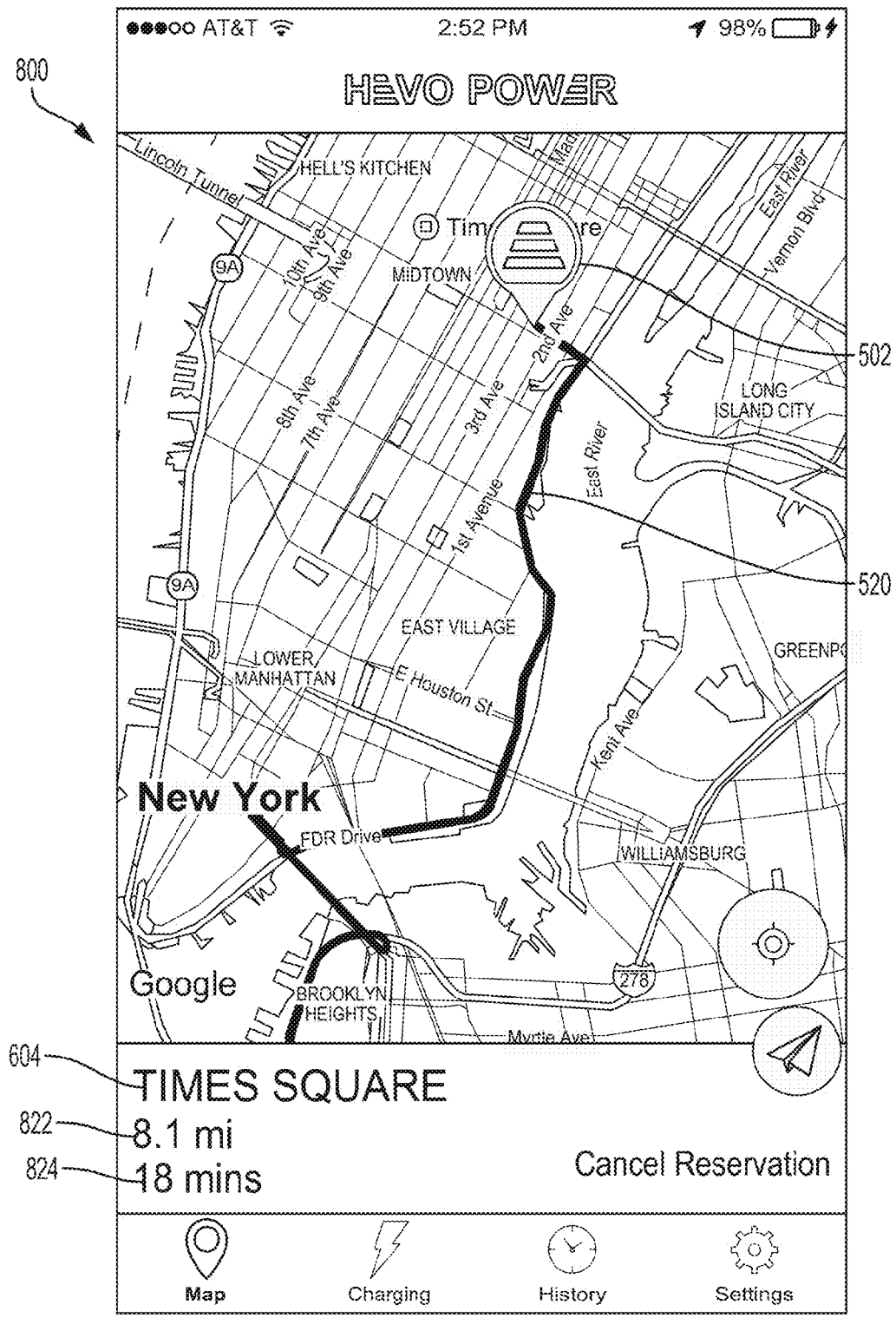
FIG. 8 is a screenshot of an example of a user interface for providing a route to a charging station according to one aspect of the present disclosure.
Figure 9:
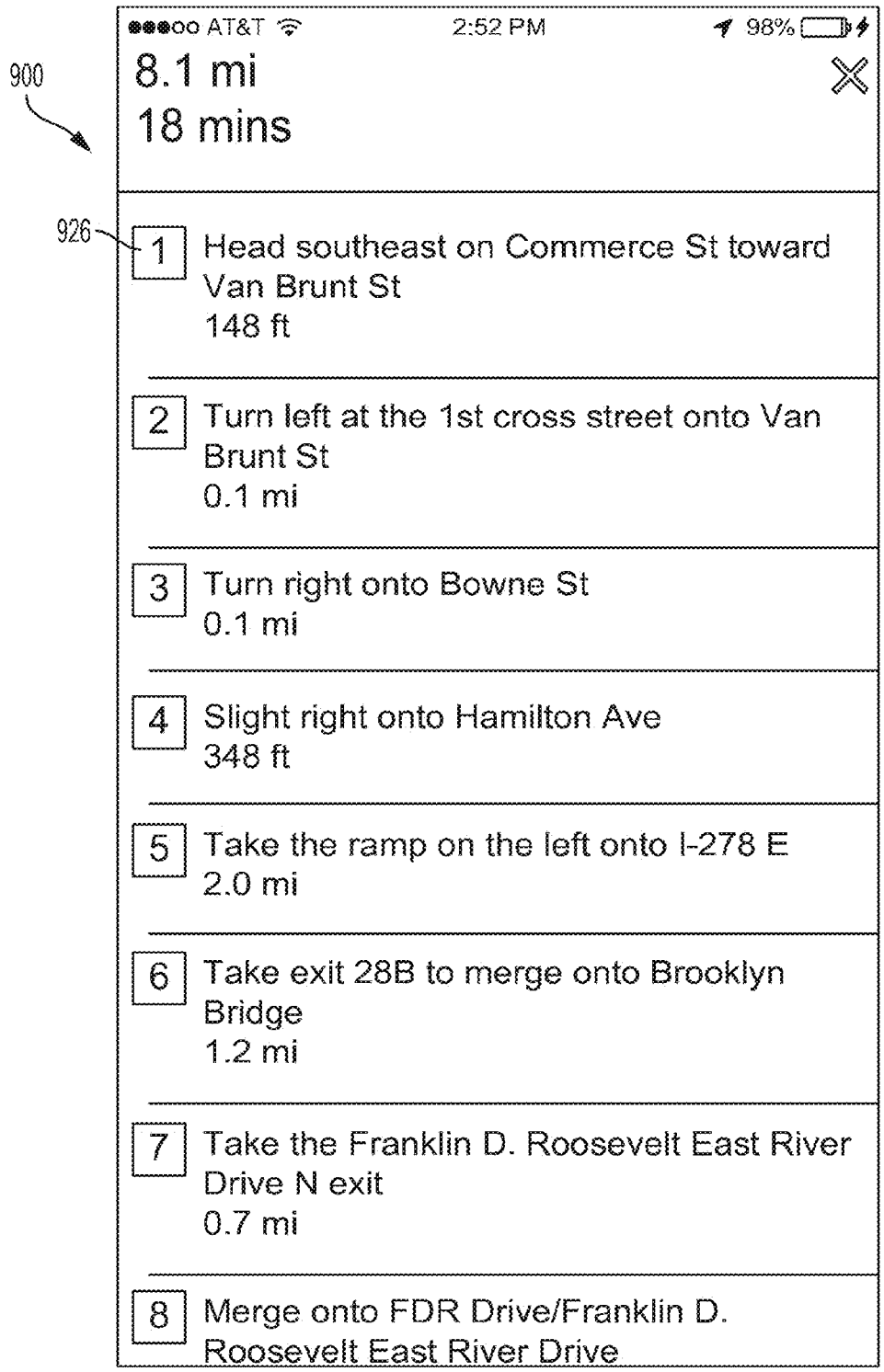
FIG. 9 is a screenshot of an example of a user interface for providing directions to a charging station according to one aspect of the present disclosure.

In FIGS. 8-9 user interfaces 800, 900 show directions to the location 502 in FIG. 5 according to some examples. The user interface 800 can depict a route 820 to the location 502 of the charging station. The user interface 800 can include the name 604 of the charging station, a distance 822 of the route 820, and a duration 824 of the route 820. The user interface 900 can show written directions 926 to the location 502 of the charging station.

Figure 10:
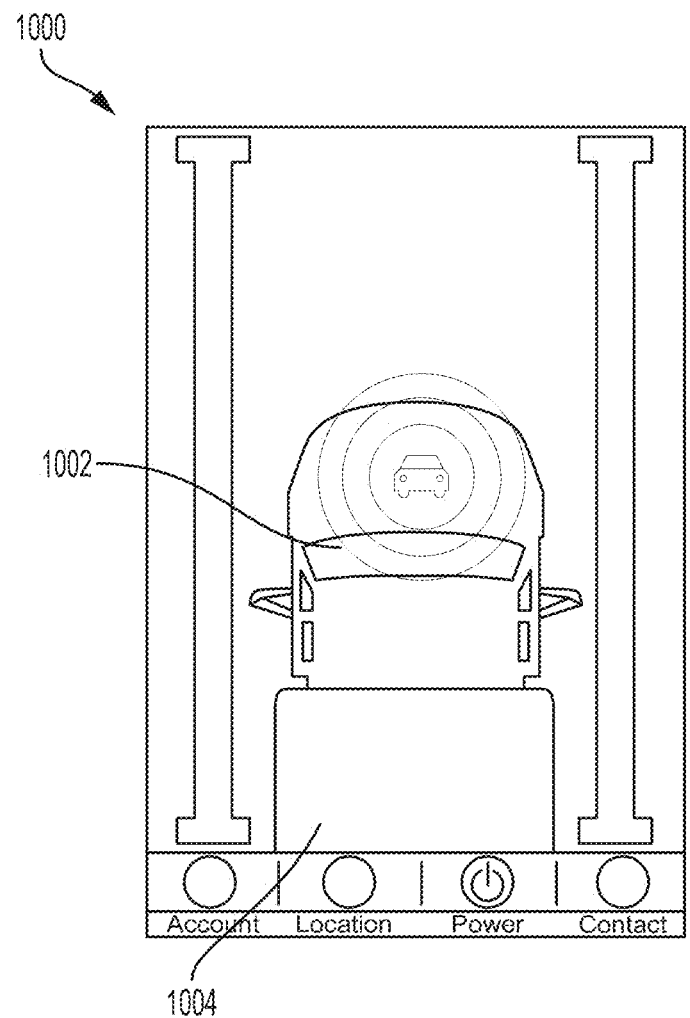
FIG. 10 is a screenshot of an example of a user interface for providing a parking sequence view according to one aspect of the present disclosure.
Figure 11:
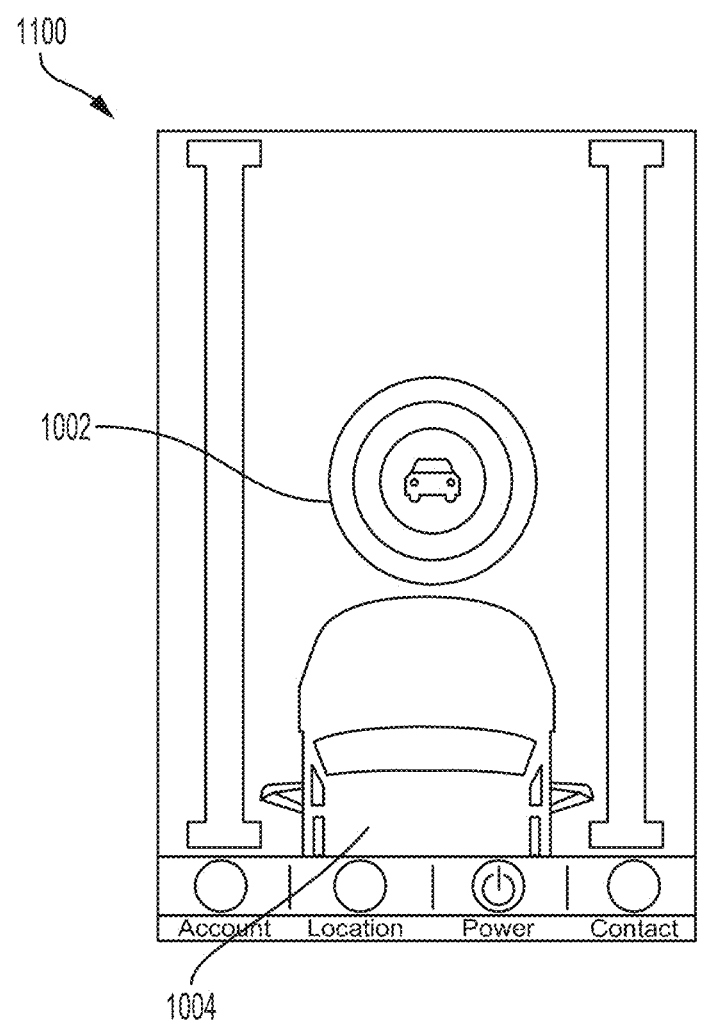
FIG. 11 is a screenshot of an example of a user interface for providing a parking sequence view with a visual indicator indicating alignment according to one aspect of the present disclosure.
Figure 12:
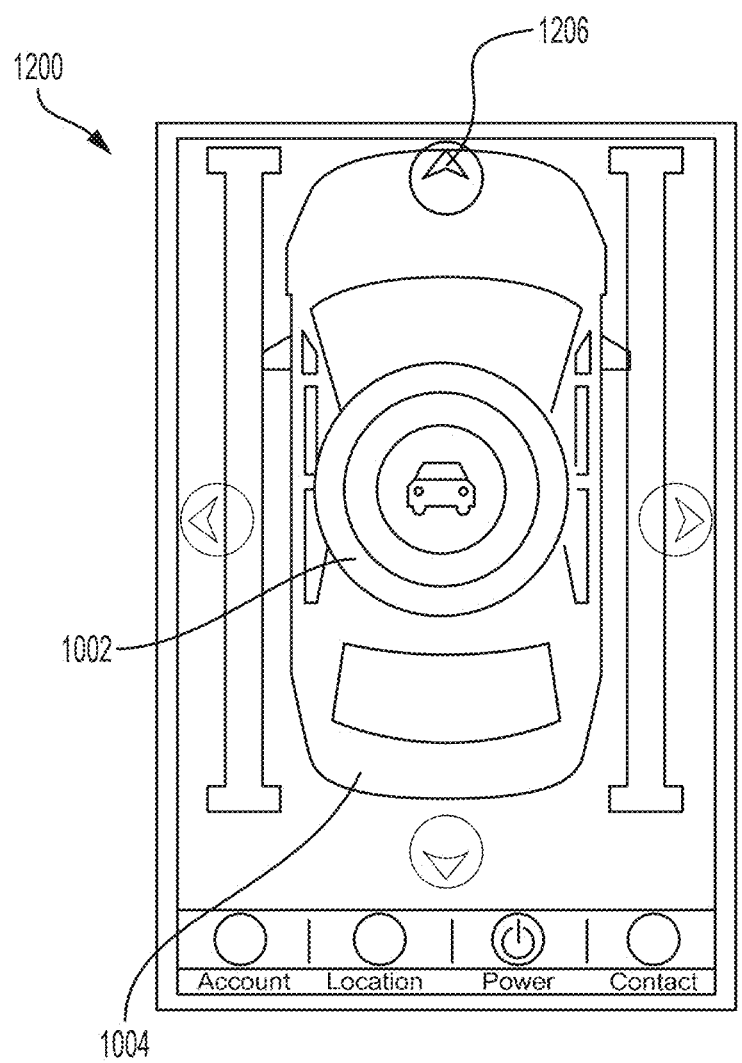
FIG. 12 is a screenshot of an example of a user interface for providing a parking sequence view with visual indicators to indicate a direction to improve alignment according to one aspect of the present disclosure.

FIGS. 10-12 depict another type of user interface 1000, 1100, 1200 for aligning a receiver of the electric vehicle with a transmitter of the charging station. In some aspects, the user interface 1000 can be automatically displayed when the electric vehicle is located within a predetermined distance from the charging station. For example, a user interface depicting a route to a charging station (e.g., user interface 500 in FIG. 9) can automatically switch to user interface 1000 based on the electric vehicle being located within twenty-five meters of the charging station. The mobile device can switch to user interface 1000 without any user input based on the charging system detecting the electric vehicle is within the predetermined distance from the charging station and notifying the mobile device.

The user interface 1000 can include a transmitter icon 1002 and a receiver icon 1004. In some aspects, the user interface 1000 can be a live stream or series of images of the electric vehicle approaching the charging station. In additional or alternative aspects, the transmitter icon 1002 and the receiver icon 1004 can be generated to represent the position of the transmitter relative to the position of the receiver.

In some examples, the transmitter icon 1002 and the receiver icon 1004 can be generated and displayed in response to the user device receiving alignment information over a short-range wireless technology (e.g., Bluetooth, ZigBee, DSRC, ANT, or WiFi.). Using short-range wireless technology to communicate alignment information can produce lower latency than using a cellular network and can provide greater precision to a user for moving the electric vehicle into alignment.

In some aspects, the user interface 1200 in FIG. 12 can depict an arrow 1206 or another visual sign for facilitating the movement of the electric vehicle into alignment. Other visual indicators can be used to depict alignment to the user. In some examples, the transmitter icon 1002 or the receiver icon 1004 can have an initial color (e.g., red) as the electric vehicle approaches the charging station. The transmitter icon 1002 or the receiver icon 1004 can brighten or change color (e.g., from red to yellow) as the electric vehicle approaches alignment. The transmitter icon 1002 or the receiver icon 1004 may brighten or change color (e.g., the transmitter icon can turn green and the receiver icon can turn blue) when the electric vehicle is aligned with the charging station.

In some additional or alternative aspects, the user device can include one or more audio signals to indicate that the electric vehicle is in an initial, an intermediate, or a final stage of alignment. The user device can also indicate when the electric vehicle has gone past proper alignment.

Figure 13:
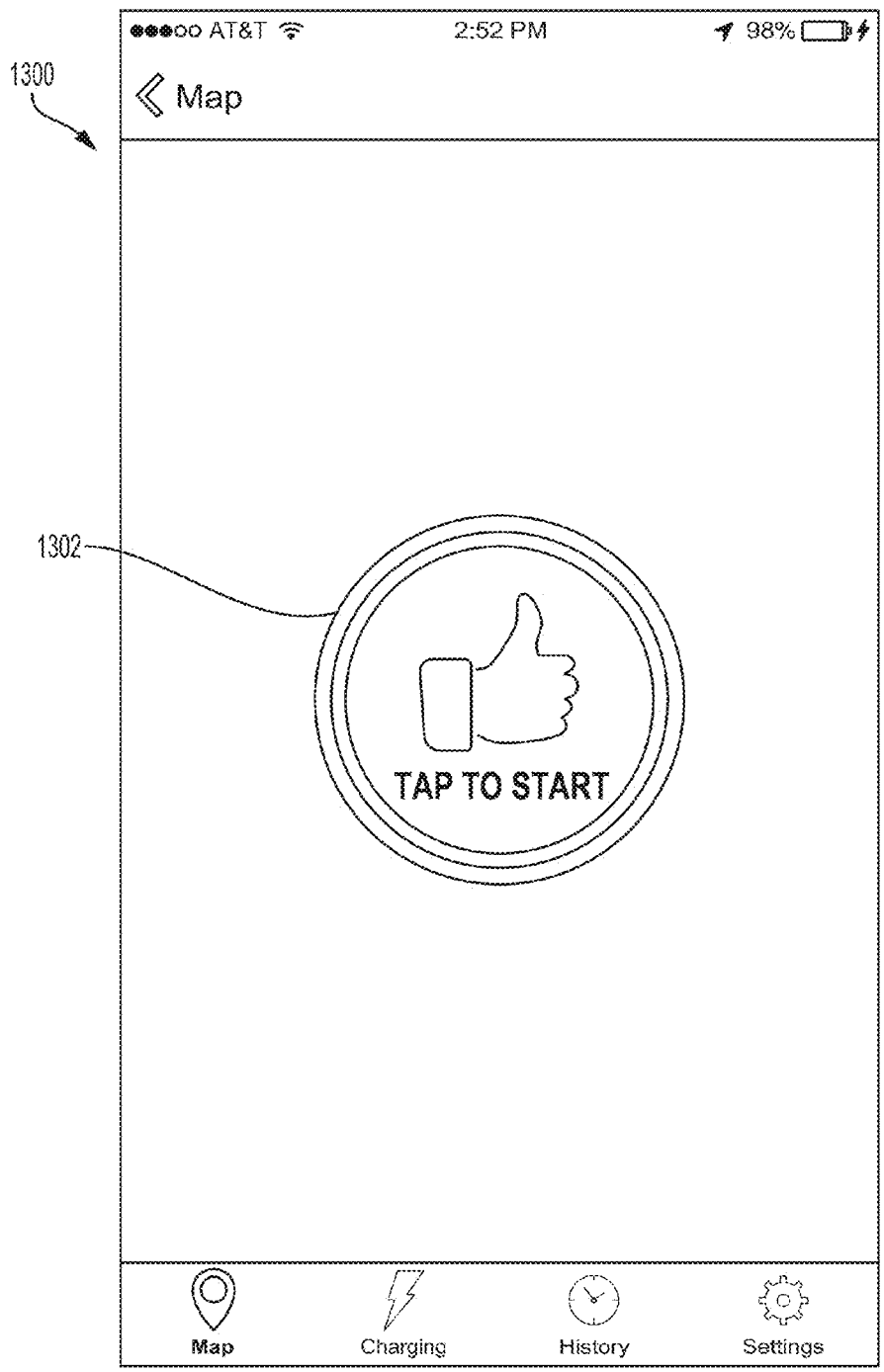
FIG. 13 is a screenshot of an example of a user interface for indicating alignment between the electric vehicle and the charging station according to one aspect of the present disclosure.

FIG. 13 includes a user interface 1300 having an icon 1302 for indicating the electric vehicle is aligned with a charging station and ready to be charged according to one example. In some aspects, alignment can include having the vehicle receiver less than five centimeters from a position at which the receiver and transmitter can theoretically have greater than 99% of a maximum efficiency for transmitting power between the two.

The icon 1302 can be activated to begin the charging process. In some aspects, the icon can automatically be activated after a predetermined period of time. In additional or alternative aspects, the icon can automatically be activated at a predetermined time (e.g., during a reservation window).

In some aspects, the user interface 1300 can accept different inputs to initiate the charging sequence. In some examples, the user interface 1300 receives input from a microphone and is voice activated. In additional or alternative examples, the user interface 1300 can automatically initiate charging after a predetermined period of time.

Figure 14:
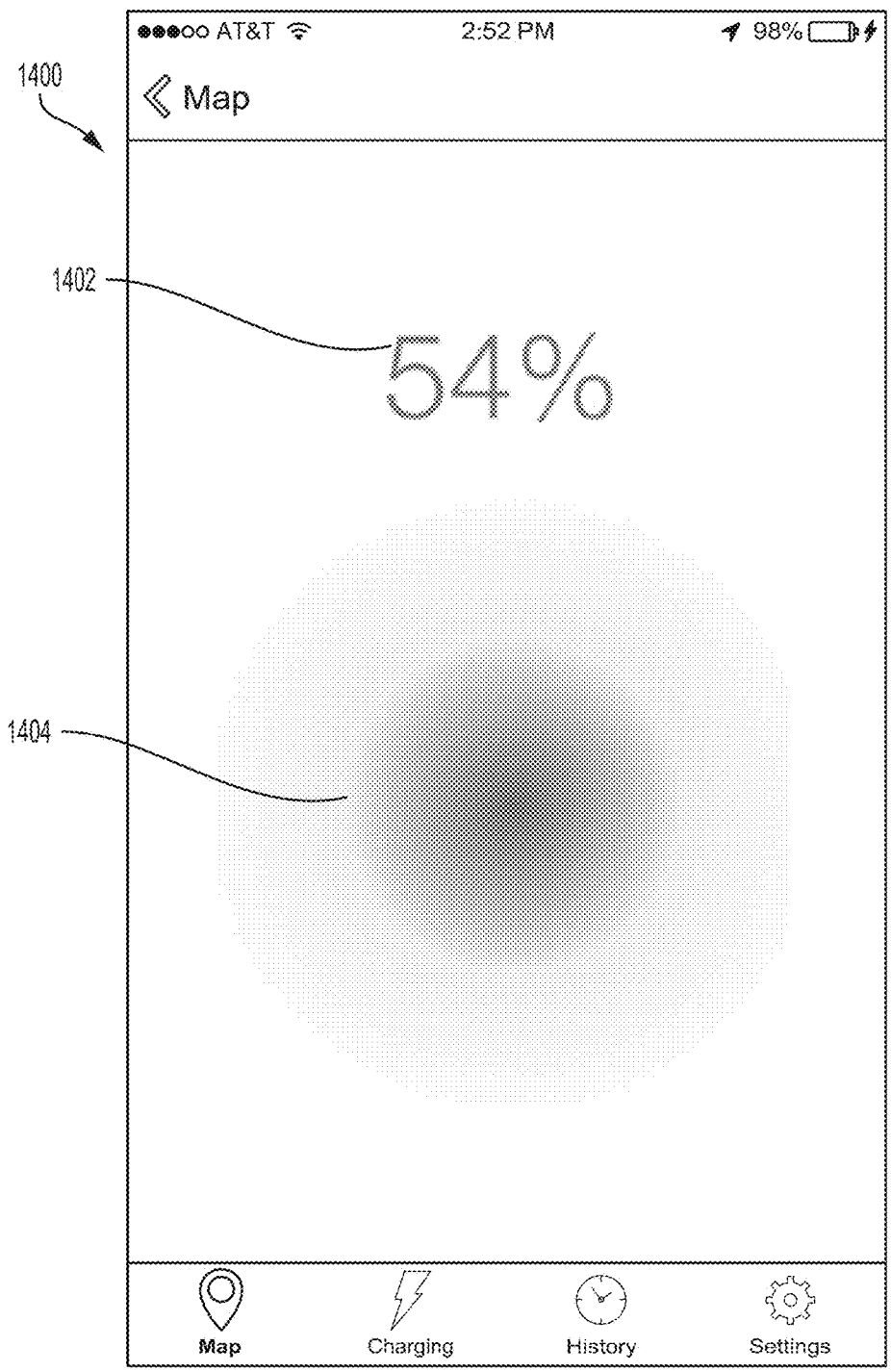
FIG. 14 is a screenshot of an example of a user interface for illustrating a partial alignment according to one aspect of the present disclosure.
Figure 15:
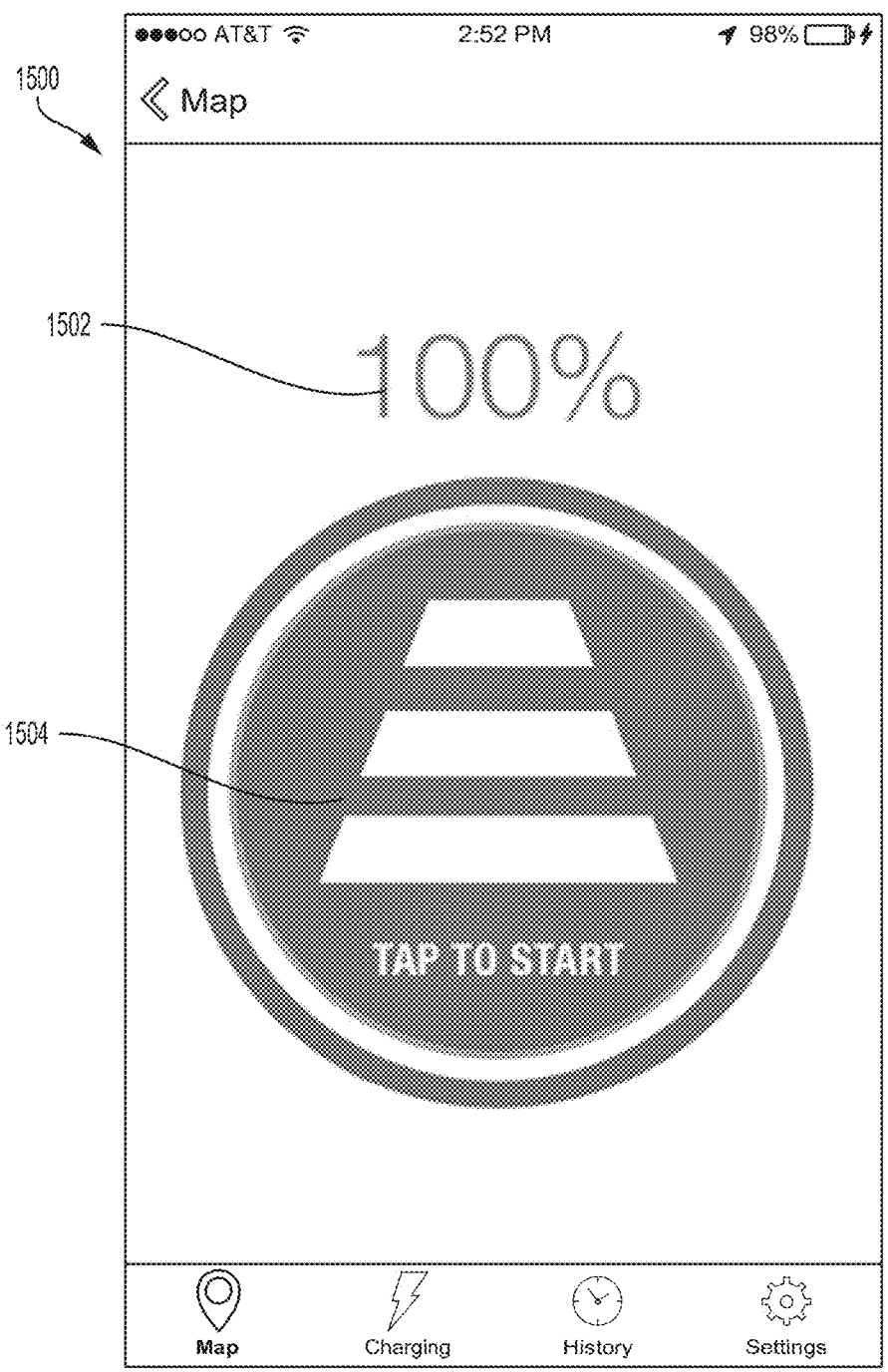
FIG. 15 is a screenshot of an example of a user interface for indicating alignment between the electric vehicle and the charging station according to one aspect of the present disclosure.

FIG. 14-15 are screenshots of user interfaces 1400, 1500 for indicating a strength of an alignment between a receiver of an electric vehicle and a transmitter of a charging station. User interfaces 1400, 1500 include a numerical icon 1402, 1502 indicating a status of the alignment. In some examples, the numerical icons 1402, 1502 can be a percentage indicating alignment status. In additional or alternative examples, the numerical icons 1402, 1502 can be a distance from alignment. The user interfaces 1400, 1500 can also include an alignment icon 1404, 1504 that can change appearance (e.g., size, color, shape) based on alignment. An alignment icon can grow from a small spot into a defined shape (e.g., the alignment icon 1504 in FIG. 15). In response to the alignment exceeding a threshold value the alignment icon 1504 can be pressed by a user to begin the charging process.

Figure 16:
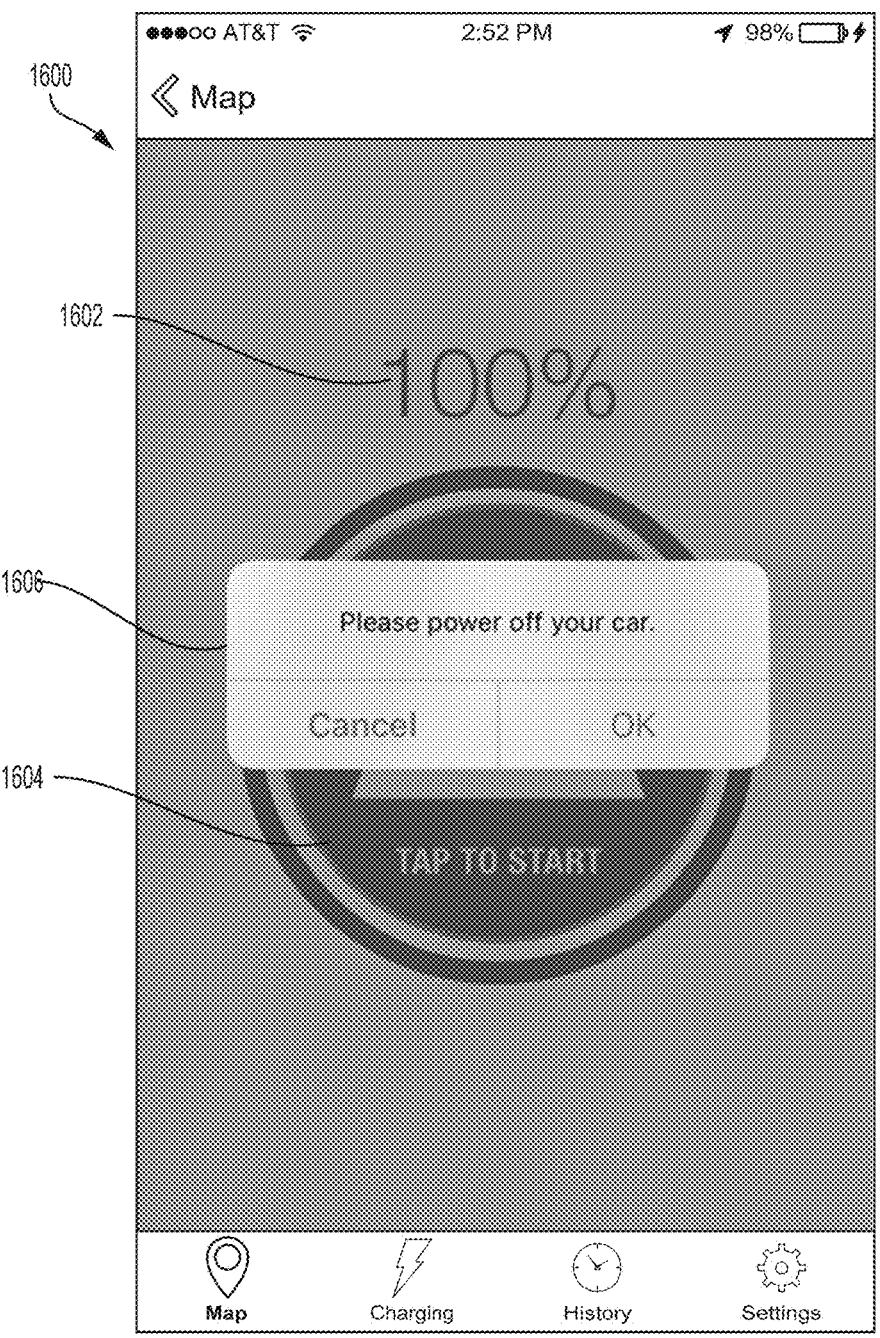
FIG. 16 is a screenshot of an example of a user interface for instructing the user to power off the electric vehicle according to one aspect of the present disclosure.

In some aspects, the user can be instructed to turn off the electric vehicle before the charging process begins. FIG. 16 is a screenshot of a user interface 1600 with instructions 1606 requesting the user power off the electric vehicle. The user interface 1600 can be similar to user interfaces 1400-1500 and include a numerical icon 1602 and an alignment icon 1604. The charging station or the electric vehicle can communicate with the user device and indicate the status of the electric vehicle as powered on or powered off. The instructions 1606 can appear in response to the user requesting the charging process begin while the electric vehicle is still powered on.

Figure 17:
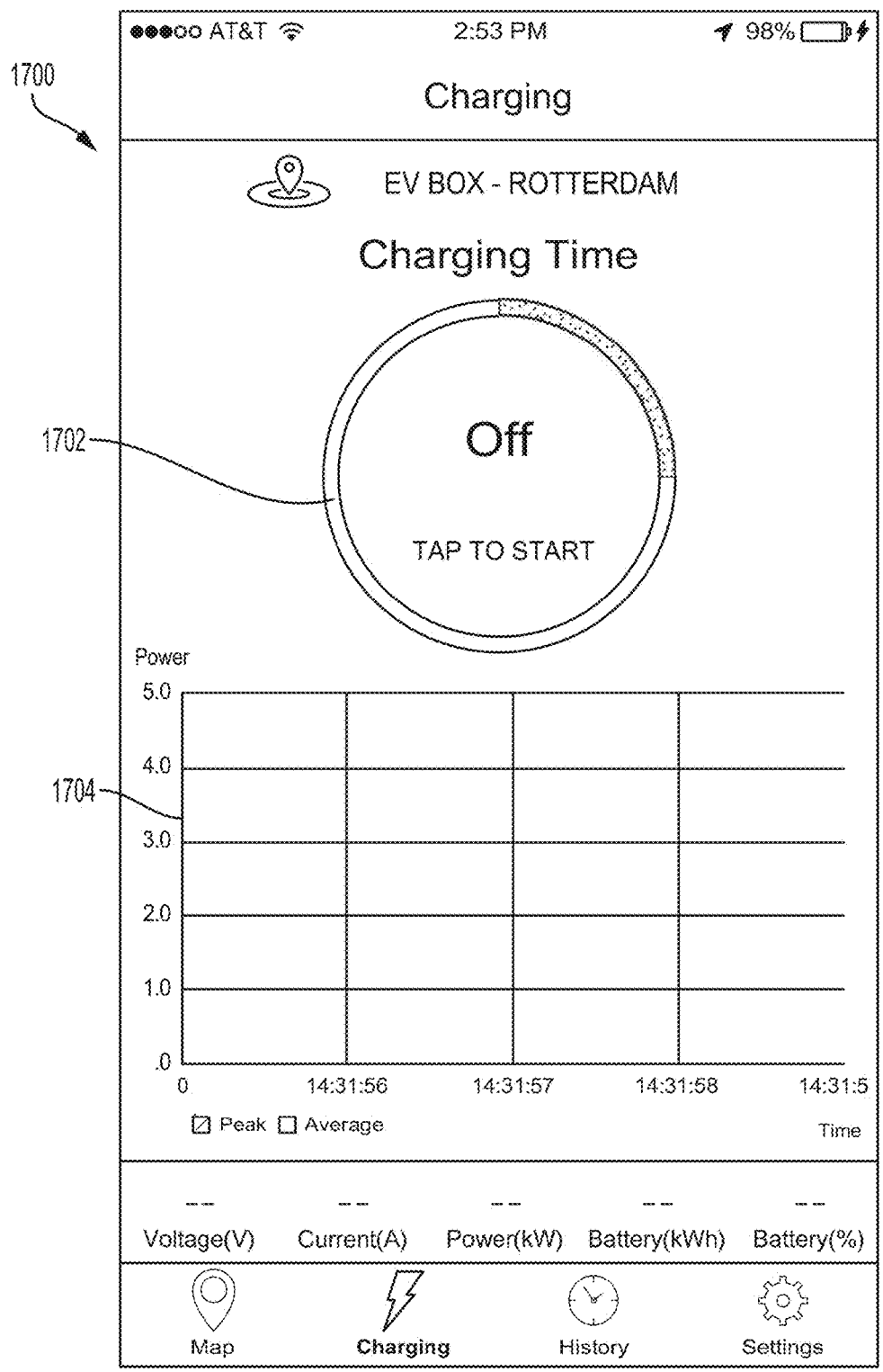
FIG. 17 is a screenshot of an example of a user interface for providing charging statistics as an electric vehicle charges according to one aspect of the present disclosure.
Figure 18:
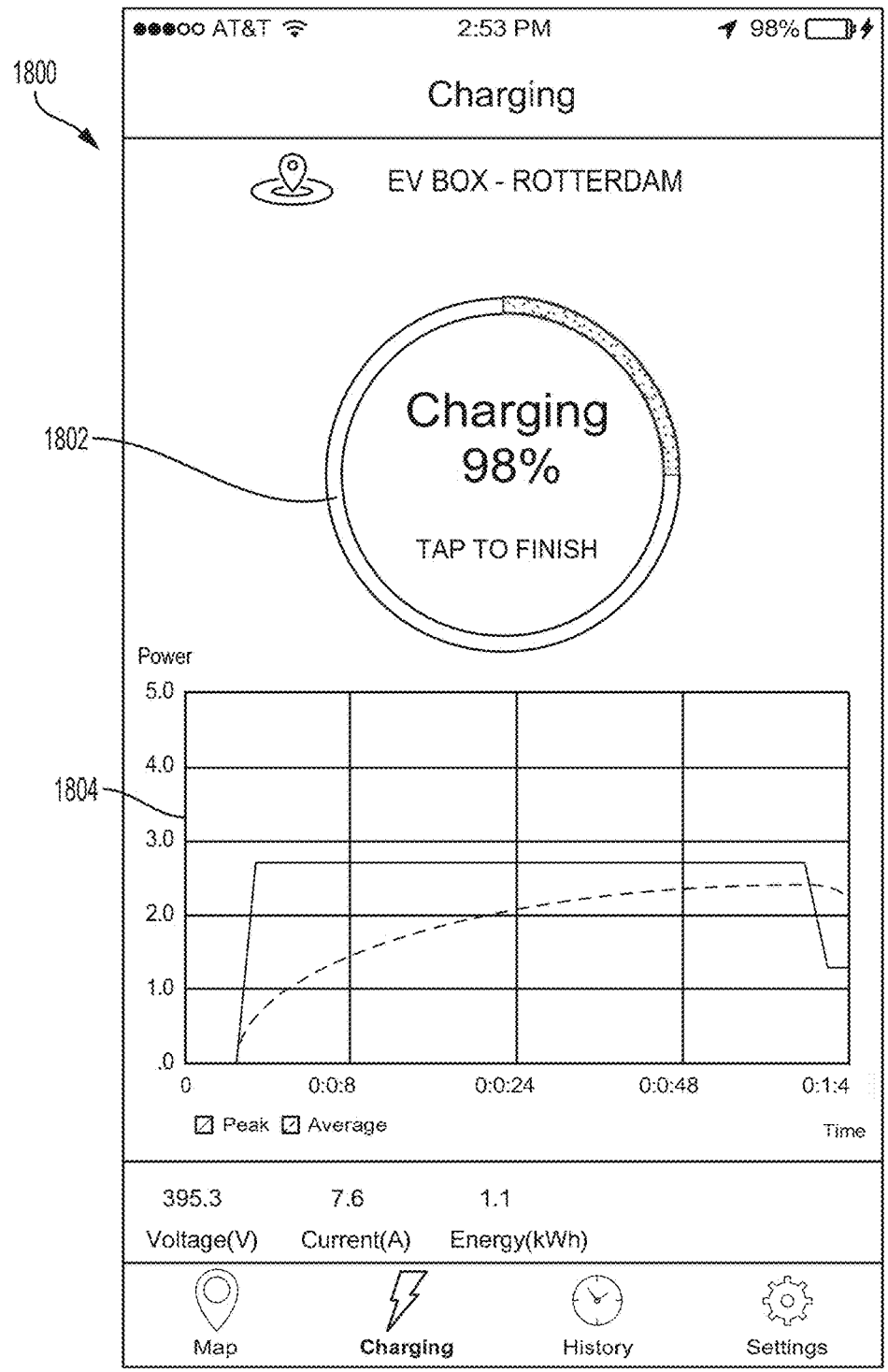
FIG. 18 is a screenshot of an example of another user interface for providing charging statistics as the electric vehicle charges according to one aspect of the present disclosure.

FIGS. 17-18 are screenshots of a user interfaces 1700, 1800 for displaying information 1704, 1804 to a user while an electric vehicle is charging according to one example. The user interface 1700, 1800 can include a charging icon 1702, 1802 indicating the progress of the charging process. In some aspects, the charging icon 1702, 1802 can change shape, color, or a numerical display to indicate the progress of the charging process. In additional or alternative aspects, the charging icon 1702, 1802 can be pressed to start or stop the charging process. In additional or alternative aspects, the charging icon 1702, 1802 can indicate progress of the charging process by changing shape or color.

In some aspects, the user interface 1700, 1800 can include options for entering a cap value to automatically stop charging when the cap value is met. In some examples, a cap value can be set for an amount of money charged, a time, or a battery percentage. The information 1704, 1804 can include a graph containing the power and average power during the charging progress. In some examples, the information 1704, 1804 can include real-time data about a voltage, a current, a power, an energy, a battery status, or a battery percentage.

Figure 19:
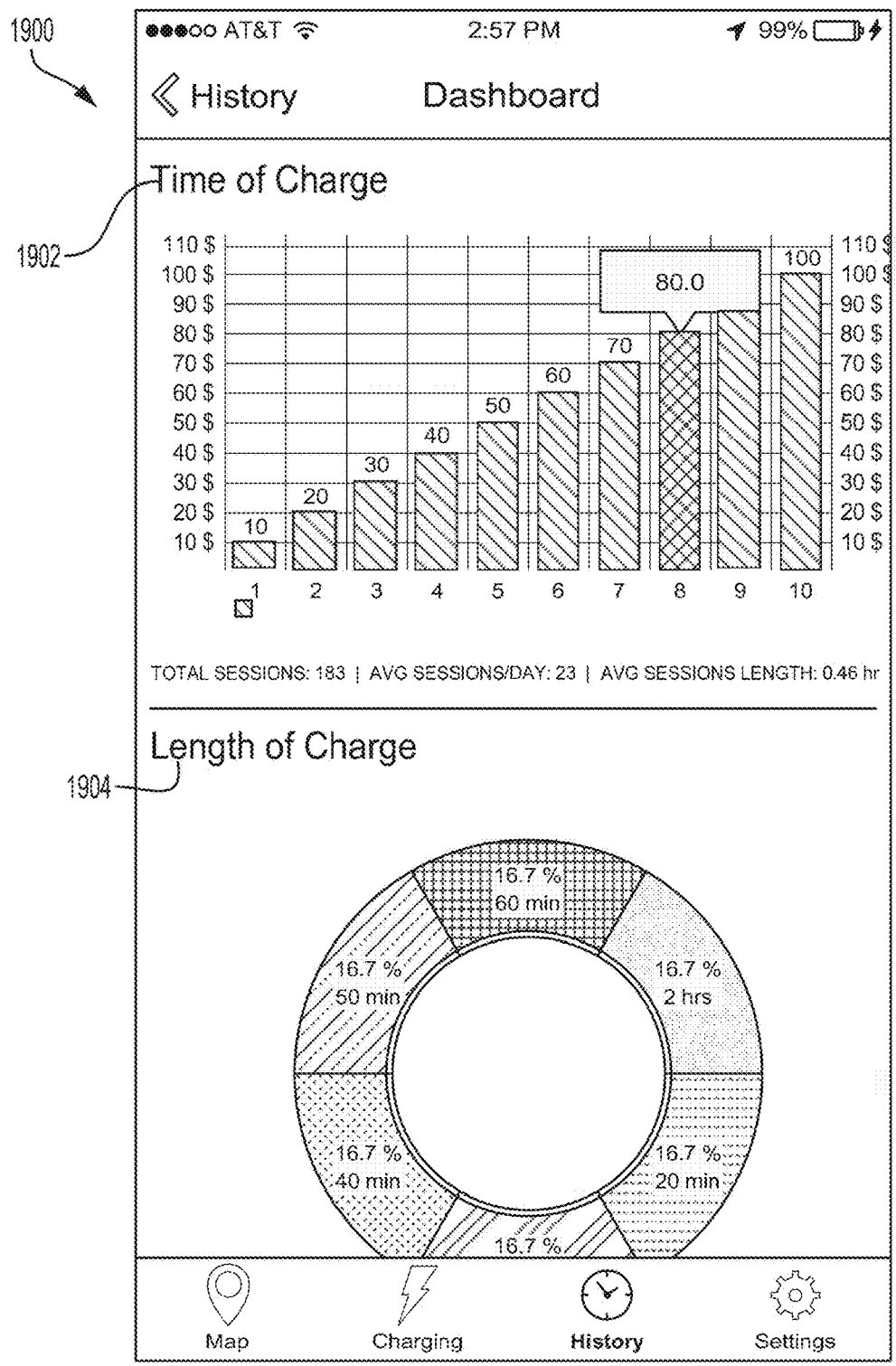
FIG. 19 is a screenshot of an example of a user interface for providing charging statistics for an account according to one aspect of the present disclosure.

FIG. 19 is a screenshot of a user interface 1900, which can automatically be displayed in response to the charging process being completed according to one example. The user interface 1900 can include recent statistics 1902 about the charging process, such as a graph depicting the time spent charging and a corresponding cost of the charging process. The user interface 1900 can also include historical statistics 1904, such as a graph indicating average lengths of charge. In some aspects, the user interface 1900 can display additional historical data including the location and time of previous charging processes.

Figure 20A:
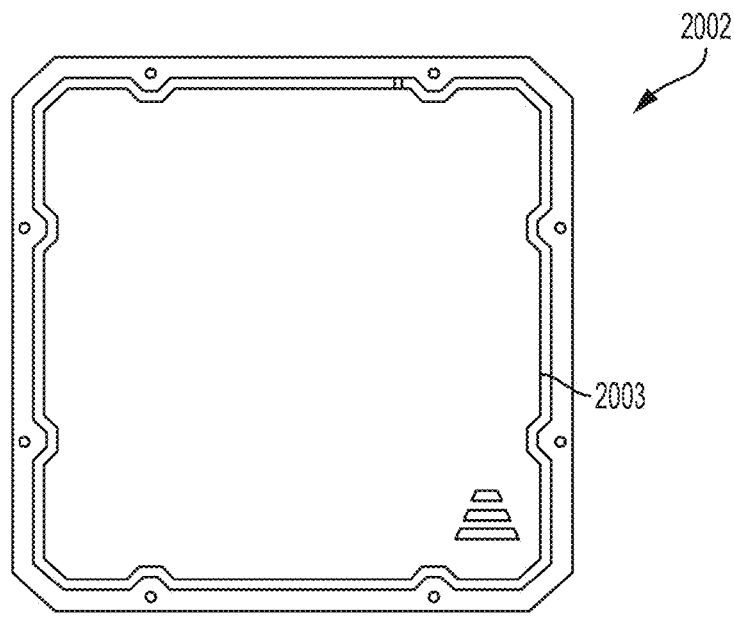
FIG. 20A is a schematic diagram of an outer area of a transmitter according to one aspect of the present disclosure.
Figure 20B:
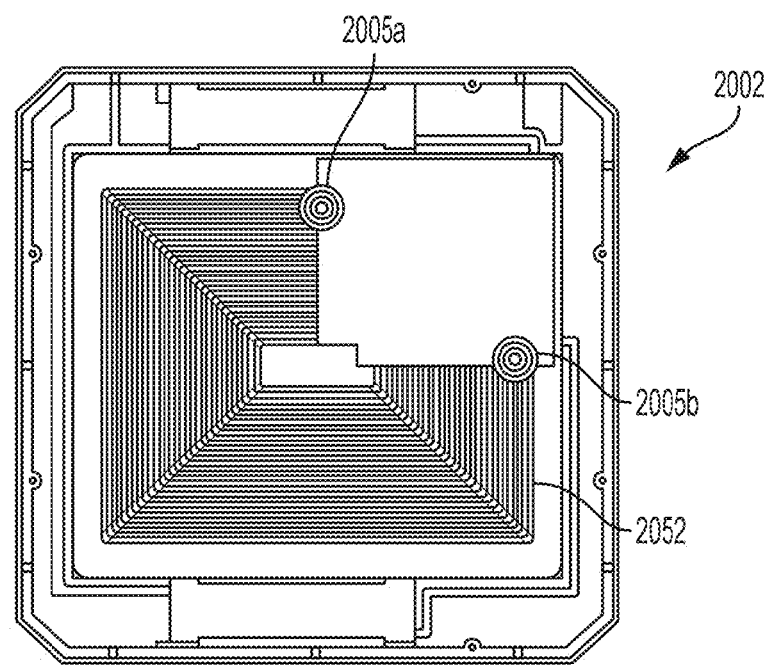
FIG. 20B is a schematic diagram of an inner area of a transmitter according to one aspect of the present disclosure.

FIGS. 20A-B are schematic diagrams of a transmitter 2002. FIG. 20A depicts a top view of the transmitter 2002 with LEDs 2003 positioned on a top surface of the transmitter 2002. The transmitter 2002 can be positioned such that the top surface of the transmitter is flush with a driving surface. In additional or alternative aspects, the transmitter 2002 can be positioned below the driving surface, positioned such that the transmitter 2002 extends from the driving surface, positioned on a wall adjacent to the driving surface, or suspended above the driving surface. The LEDs 2003 can be activated to signal information regarding a status of the transmitter 2002 to a user. For example, the LEDs 2003 can illuminate a predetermined color (e.g., green) to indicate the transmitter 2002 is available for charging a receiver. In additional or alternative examples, the LEDs 2003 can illuminate to indicate the transmitter 2003 is reserved or that an obstruction is preventing efficient transfer of power from the transmitter 2002 to a receiver. Although FIG. 20A depicts the LEDs 2003 as positioned along an edge of the top surface of the transmitter 2002, any number of LEDs can be positioned in any arrangement on the top surface.

FIG. 20B depicts a partial cross-sectional view of the transmitter 2002, including a portion of a primary coil 2052 and sensor coils 2005*a-b*. The primary coil 2052 can include a wire coil for generating an electromagnetic field in response to passing a current through the coil. The sensor coils 2005*a-b* can be positioned above (e.g., closer to a top surface of the transmitter 2002) the primary coil 2052. The primary coil can be activated to a low power state (e.g., less than 40 W) and produce an electromagnetic field that encompasses the sensor coils 2005*a-b*. The sensor coils 2005*a-b* can respond to objects (e.g., a receiver) moving through the electromagnetic field by generating a voltage. Comparing the differences in voltages generated by each sensor coil 2005*a-b* can indicate a location of the object relative to the transmitter 2002. Although FIG. 20B depicts two sensor coils 2005*a-b*, the transmitter 2002 can include any number of sensor coils. In some examples, data from the sensor coils 2005*a-b* can be used to determine the direction a receiver should be moved to improve alignment between the receiver and the transmitter 2002. In additional or alternative examples, sensor coils can be placed on one side of a circuit board positioned above the primary coil 2052. The sensor coils can be grouped based on different portions of the circuit board (e.g., quadrants) and can be activated as a group.

In one example, a user can be a driver of an electric vehicle. The driver can have a mobile device with a mobile app for performing a parking alignment sequence for charging the electric vehicle. The mobile app can communicate with a server over a cellular network to determine all charging stations within 500-meters of the mobile device and display the location of the charging stations to the driver via a user interface. The driver can select one of the charging stations in the user interface and request a reservation for a transmitter at the charging station. The mobile app can with the server over the cellular network to complete the reservation. The mobile app can use GPS to determine the current location of the mobile device and display directions to the charging station. As the electric vehicle approaches the charging station, the user interface can display a progressively zoomed in map of the electric vehicle in relation to the charging station.

A ZigBee communication link can begin once the electric vehicle is twenty meters from the charging station. A handshake can occur between the transmitter, receiver, and mobile app through the server. At substantially the same time, a Bluetooth communication link can begin between the transmitter (e.g., an inverter) and a receiver (e.g., a rectifier). The handshake process can take 1-15 seconds.

When the strength of the ZigBee communication link is in the range of 16-55 dB, a processing device (e.g., a raspberry pi) in the transmitter can transmit an "in-range" status to the server alerting the mobile app to transition to a parking alignment screen. At substantially the same time, the mobile app can request constant calls at a rate of one message per second to the server to obtain the "in-range" status. Once the "in-range" status has been transmitted and received, the mobile app can transition to the parking alignment screen. The transition can occur as the vehicle receiver and the wireless charging transmitter are within 5-meters of each other.

After the "in-range" status has been transmitted and received between the mobile app and the server, the processing device can wait for approximately 1 second until a TCP socket server has been initiated. Once the TCP socket server embedded in the mobile app has been initiated, it can stand-by for connection requests from the processing device. Once the connection has been established with the processing device, the processing device can begin transmitting antenna values directly to the mobile app. When the processing device commences the transmission of antennas values through the TCP socket server, the mobile app can translate the antenna values to an x-y position through trilateration and constantly loop the changing antenna values (measured in mV) to precisely distinguish the vehicle receiver location in relation to the wireless charging transmitter. Using the low frequency antennas, parking alignment accuracy of less than five centimeters from perfect center alignment can be achieved. The optimal alignment of the vehicle receiver with the wireless charging transmitter can be achieved when there is less than 200 mV signal strength differentiation between the low frequency receiver antennas and low frequency transmitter antennas. The alignment accuracy can also be visually in sync with the mobile app parking alignment screens at a fixed ratio of pixels per centimeter.

When the vehicle receiver and the wireless charging transmitter are less than five centimeters from perfect alignment, a green "thumbs up" can appear on the parking alignment screen. Tapping the green "thumbs up" can result in a "jingle" noise and animated "halo" that transitions the mobile app to a "start charging" screen. At substantially the same time, an "aligned" status can be sent from the mobile app to the server. The processing device can leave the TCP socket server connection and wait for the next user command.

The driver can select a method of charging and tap a "start charging" button on a user interface. The mobile app can send a "start" command to a server to update an "inverter- Mode" field to "true," which is an end point called "/commands" (the "/commands" end point can have "read only" properties and may not be changeable by the processing device or the mobile app). The processing device can continuously check the inverterMode status on an infinite loop at a rate of the internet connection. When the inverterMode is updated to "true," the processing device can send a "reset" command to the transmitter via a communication device (e.g., RS485) and then the "enable" command one second after the "reset" command. At this point, the transmitter can establish communication with the vehicle MBS via a quick charging connection cable (e.g., a CHAdeMO cable) and a quick charging protocol (e.g., a CHAdeMO protocol). The transmitter can then start in a constant current mode or a constant voltage mode depending on state of charging.

A charging user interface displayed by the mobile app can display a current status of the transmitter. The driver can tap on a "TAP TO START" button to start the transmitter and charging can start. A graph containing the power and average power can be shown to the driver.

Upon starting the charging process, the processing device can send an "All" command to the transmitter via the communication device. The transmitter can transmit a data stream in response to the "All" command that contains the transmitter state and charging characteristics back to the processing device via the communication device. This information can be streamed via an internet connection to the server. The server can convert the streamed data to readable information and supply the data to the online diagnostics website as a real-time charging report screen. The data presented to the driver can consist of all charging characteristics with graphs and illustrations.

Once charging is done or the driver taps a "TAP TO FINISH" button, a summary page can be displayed containing information about how long the charging session was and how much the car has been charged. The mobile app can send a "stop" command to the server, which can update the inverterMode to "false." The processing device can continue to constantly check the inverterMode status on an infinite loop at the rate of the internet connection. When the inverterMode is updated to "false," the processing device can send a "disable" command and then the "reset" command to the transmitter via the communication device one second after the "reset" command. The transmitter can disable communication with the vehicle BMS via the quick charging connection cable and the quick charging protocol, ZigBee and Bluetooth. The transmitter can then end the charging process and enable the vehicle to be driven.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    determining, by a processing device of a user device, a location of a charging station based on a communication that is over a cellular network and that is between the user device and the charging station, the charging station having a transmitter for wirelessly transmitting power to a receiver of an electric vehicle for charging the electric vehicle;
    generating, by the processing device, a first user interface for display to a user associated with the electric vehicle, the first user interface having directions to the charging station from a current location of the user device;
    determining, by the processing device, that the electric vehicle is located within a first predetermined distance from the charging station that is physically separate from the electric vehicle;
    determining, by the processing device, alignment data at least in part by measuring a strength of a surrounding electromagnetic field using one or more low frequency antennas coupled to at least one of the transmitter or the receiver;
    receiving, by the processing device, the alignment data wirelessly transmitted from the charging station via a communication path that is independent of the cellular network in response to determining that the electric vehicle is located within the first predetermined distance from the charging station;
    generating, by the processing device, a second user interface for display to the user, the second user interface having alignment instructions for moving the electric vehicle into alignment with the charging station based on the alignment data in response to the electric vehicle being located within the first predetermined distance from the charging station; and
    activating, by the processing device, a primary coil associated with the transmitter to a lower power state in which power to the primary coil is below that of a higher power state in response to determining that the receiver is within a second predetermined distance from the transmitter.

2. The method of claim 1, wherein the alignment data comprises first alignment data and second alignment data, the method further comprising:
    determining, by the processing device, the second alignment data in response to the electric vehicle being located within the second predetermined distance from the charging station, the second predetermined distance being smaller than the first predetermined distance; and
    displaying, by the processing device, a third user interface having charging information based on the second alignment data.

3. The method of claim 2, wherein displaying the first user interface comprises receiving the current location of the electric vehicle using a global positioning system, wherein receiving the first alignment data independent of the cellular network comprises receiving the first alignment data using a short-range wireless technology, wherein determining the second alignment data comprises:
    receiving electromagnetic field data from the one or more low frequency antennas; and
    comparing the electromagnetic field data from the one or more low frequency antennas to determine second alignment data, the electromagnetic field data indicating a strength of an electromagnetic field emitted by the transmitter at a position of the one or more low frequency antennas.

4. The method of claim 3, wherein receiving alignment data using the short-range wireless technology comprises using Zigbee to communicate between the receiver and the transmitter.

5. The method of claim 2, wherein displaying the third user interface having the charging information comprises determining the receiver is within a threshold distance of a position for obtaining 95% or greater efficiency in transferring power wirelessly between the transmitter and the receiver.

6. The method of claim 2, wherein displaying the third user interface having the charging information comprises displaying an option to begin charging the electric vehicle, the method further comprising:

receiving, by the processing device, real-time information independent of the cellular network, the real-time information including a receiver voltage, a receiver current, a number of kilowatt hours, a time spent, the location of the charging station, an amount of money charged, and a charging efficiency; and displaying, by the processing device, the real-time information on the third user interface.

7. The method of claim 2, wherein receiving first alignment data comprises receiving first alignment data that is based on a position of the electric vehicle relative to the charging station, wherein determining second alignment data comprises determining second alignment data that is based on a position of the receiver relative to the transmitter.

8. A system comprising:

a processing device of a user device; and a memory device on which instructions are stored for causing the processing device to:

determine a location of a charging station based on a communication that is over a cellular network and that is between the user device and the charging station, the charging station having a transmitter for wirelessly transmitting power to a receiver of an electric vehicle for charging the electric vehicle;

generate a first user interface for display to a user associated with the electric vehicle, the first user interface having directions to the charging station from a current location of the user device;

determine that the electric vehicle is located within a first predetermined distance from the charging station that is physically separate from the electric vehicle;

determine alignment data at least in part by measuring a strength of a surrounding electromagnetic field using one or more low frequency antennas coupled to at least one of the transmitter or the receiver;

receive the alignment data wirelessly transmitted from the charging station via a communication path that is independent of the cellular network in response to determining that the electric vehicle is located within the first predetermined distance from the charging station;

generate a second user interface for display to a user associated with the electric vehicle, the second user interface having alignment instructions for moving the electric vehicle into alignment with the charging station based on the alignment data in response to the electric vehicle being located within the first predetermined distance from the charging station; and activate a primary coil associated with the transmitter to a lower power state in which power to the primary coil is below that of a higher power state in response to determining that the receiver is within a second predetermined distance from the transmitter.

9. The system of claim 8, wherein the alignment data comprises first alignment data and second alignment data, wherein the memory device further comprises additional instructions for causing the processing device to:

determine the second alignment data in response to the electric vehicle being located within the second predetermined distance from the charging station, the second predetermined distance being smaller than the first predetermined distance; and display a third user interface having charging information based on the second alignment data.

10. The system of claim 9, wherein the instructions for causing the processing device to display the first user interface comprises receiving the current location of the electric vehicle using a global positioning system, wherein the instructions for causing the processing device to receive the first alignment data independent of the cellular network comprises receiving the first alignment data using a short-range wireless technology, wherein the instructions for causing the processing device to determine the second alignment data comprises:

receiving electromagnetic field data from the one or more low frequency antennas; and comparing the electromagnetic field data from the one or more low frequency antennas to determine the second alignment data, the electromagnetic field data indicating a strength of an electromagnetic field emitted by the transmitter at a position of the one or more low frequency antennas.

11. The system of claim 10, wherein the instructions for causing the processing device to receive the alignment data using the short-range wireless technology comprises using Zigbee to communicate between the receiver and the transmitter.

12. The system of claim 9, wherein the instructions for causing the processing device to display the third user interface having the charging information comprises determining the receiver is within a threshold distance of a position for obtaining 95% or greater efficiency in transferring power wirelessly between the transmitter and the receiver.

13. The system of claim 9, wherein the instructions for causing the processing device to display the third user interface having the charging information comprises displaying an option to begin charging the electric vehicle, wherein the memory device further comprises additional instructions for causing the processing device to:

receive real-time information independent of the cellular network, the real-time information including a receiver voltage, a receiver current, a number of kilowatt hours, a time spent, the location of the charging station, an amount of money charged, and a charging efficiency; and display the real-time information on the third user interface.

14. The system of claim 9, wherein the instructions for causing the processing device to receive first alignment data comprises receiving first alignment data that is based on a position of the electric vehicle relative to the charging station, wherein the instructions for causing the processing device to determine second alignment data comprises determining second alignment data that is based on a position of the receiver relative to the transmitter.

15. A non-transitory computer-readable medium in which instructions executable by a processing device of a user device are stored for causing the processing device to:

determine a location of a charging station based on a communication that is over a cellular network and that is between the user device and the charging station, the charging station having a transmitter for wirelessly transmitting power to a receiver of an electric vehicle for charging the electric vehicle;

generate a first user interface for display to a user associated with the electric vehicle, the first user interface having directions to the charging station from a current location of the user device;

determine that the electric vehicle is located within a first predetermined distance from the charging station that is physically separate from the electric vehicle;

determine alignment data at least in part by measuring a strength of a surrounding electromagnetic field using one or more low frequency antennas coupled to at least one of the transmitter or the receiver;

receive the alignment data wirelessly transmitted from the charging station via a communication path that is independent of the cellular network in response to determining that the electric vehicle being located within the first predetermined distance from the charging station;

generate a second user interface for display to a user associated with the electric vehicle, the second user interface having alignment instructions for moving the electric vehicle into alignment with the charging station based on the alignment data in response to the electric vehicle being located within the first predetermined distance from the charging station; and activate a primary coil associated with the transmitter to a lower power state in which power to the primary coil is below that of a higher power state in response to determining that the receiver is within a second predetermined distance from the transmitter.

16. The non-transitory computer-readable medium of claim 15, wherein the alignment data comprises first alignment data and second alignment data, the non-transitory computer-readable medium further comprising additional instructions executable by the processing device for causing the processing device to:

determine the second alignment data in response to the electric vehicle being located within the second predetermined distance from the charging station, the second predetermined distance being smaller than the first predetermined distance; and display a third user interface having charging information based on the second alignment data.

17. The non-transitory computer-readable medium of claim 16, wherein the instructions executable by the processing device for causing the processing device to display the first user interface comprises receiving the current location of the electric vehicle using a global positioning system, wherein the instructions executable by the processing device for causing the processing device to receive the first alignment data independent of the cellular network comprises receiving the first alignment data using a short-range wireless technology, wherein the instructions executable by the processing device for causing the processing device to determine the second alignment data comprises:

receiving electromagnetic field data from the one or more low frequency antennas; and comparing the electromagnetic field data from the one or more low frequency antennas to determine the second alignment data, the electromagnetic field data indicating a strength of an electromagnetic field emitted by the transmitter at a position of the one or more low frequency antenna.

18. The non-transitory computer-readable medium of claim 17, wherein the instructions executable by the processing device for causing the processing device to receive the alignment data using the short-range wireless technology comprises using Zigbee to communicate between the receiver and the transmitter.

19. The non-transitory computer-readable medium of claim 16, wherein the instructions executable by the processing device for causing the processing device to display the third user interface having the charging information comprises determining the receiver is within a threshold distance of a position for obtaining 95% or greater efficiency in transferring power wirelessly between the transmitter and the receiver.

20. The non-transitory computer-readable medium of claim 16, wherein the instructions executable by the processing device for causing the processing device to receive first alignment data comprises receiving first alignment data that is based on a position of the electric vehicle relative to the charging station, wherein the instructions executable by the processing device for causing the processing device to determine second alignment data comprises determining second alignment data that is based on a position of the receiver relative to the transmitter.

* * * * *